(12) United States Patent
Ren et al.

(10) Patent No.: US 11,756,306 B2
(45) Date of Patent: Sep. 12, 2023

(54) ANTI-DROWNING SAFETY ALARM METHOD AND DEVICE FOR SWIMMING POOL

(71) Applicant: Hangzhou Juyan Xincheng Technology Co. Ltd., Hangzhou (CN)

(72) Inventors: Xiao Feng Ren, Hangzhou (CN); Xin Xie, Hangzhou (CN); Yu Guo, Hangzhou (CN); Dong Yan Guo, Hangzhou (CN); Zhen Hua Wang, Hangzhou (CN); Jian Hua Zhang, Hangzhou (CN); Du Si Zhang, Hangzhou (CN)

(73) Assignee: Hangzhou Juyan Xincheng Technology Co. Ltd., Hangzhou (CN)

( * ) Notice: Subject to any disclaimer, the term of this patent is extended or adjusted under 35 U.S.C. 154(b) by 0 days.

(21) Appl. No.: 18/094,388

(22) Filed: Jan. 8, 2023

(65) Prior Publication Data
US 2023/0222804 A1 Jul. 13, 2023

(30) Foreign Application Priority Data
Jan. 10, 2022 (CN) .......................... 202210022875.6

(51) Int. Cl.
*G06V 20/52* (2022.01)
*G06T 7/292* (2017.01)
(Continued)

(52) U.S. Cl.
CPC .............. *G06V 20/52* (2022.01); *G06T 7/248* (2017.01); *G06T 7/292* (2017.01); *G06T 7/74* (2017.01);
(Continued)

(58) Field of Classification Search
None
See application file for complete search history.

(56) References Cited

U.S. PATENT DOCUMENTS

2017/0323154 A1* 11/2017 Kollmann ................ G06N 3/02
2019/0034712 A1* 1/2019 Golan ....................... G06T 7/73
(Continued)

FOREIGN PATENT DOCUMENTS

| CN | 112800825 A | 5/2021 |
| CN | 113688724 A | 11/2021 |

OTHER PUBLICATIONS

Automated Vision-based Surveillance System to Detect Drowning Incidents in Swimming Pool. Alshbatat et al. (Year: 2020).*

*Primary Examiner* — Delomia L Gilliard

(57) ABSTRACT

The embodiment of the present invention discloses an anti-drowning safety alarm method and device for swimming pools. Acquiring images taken by multiple cameras; inputting the images into a target detection model to detect human bodies and heads, so as to obtain human body target detection boxes and human head target detection boxes; calculating the relationship between the human heads and the human bodies according to these boxes; performing multi-camera fusion on the human body target detection boxes and the human head target detection boxes to obtain the human body boxes and head boxes; determining the relative position relationship between the human bodies or the human heads and the water surface; calculating the correlation between the bounding box sequence at the current moment and that at the previous moment to obtain the human tracking trajectory; updating the state database; generating alarm information according to the state database.

7 Claims, 8 Drawing Sheets

(51) Int. Cl.
*G06T 7/246* (2017.01)
*G06V 10/82* (2022.01)
*G06V 10/774* (2022.01)
*G06T 7/73* (2017.01)
*H04N 7/18* (2006.01)
*G08B 21/02* (2006.01)
*G06V 40/10* (2022.01)
*H04N 23/90* (2023.01)

(52) U.S. Cl.
CPC ............ *G06V 10/774* (2022.01); *G06V 10/82* (2022.01); *G06V 40/10* (2022.01); *G08B 21/02* (2013.01); *H04N 7/181* (2013.01); *G06T 2207/20081* (2013.01); *G06T 2207/20084* (2013.01); *G06T 2207/20221* (2013.01); *G06T 2207/30196* (2013.01); *G06T 2207/30241* (2013.01); *G06T 2207/30244* (2013.01); *G06V 2201/07* (2022.01); *H04N 23/90* (2023.01)

(56) References Cited

U.S. PATENT DOCUMENTS

| | | | |
|---|---|---|---|
| 2019/0205608 A1* | 7/2019 | Weitzman | G06V 40/165 |
| 2020/0388135 A1* | 12/2020 | Vaknin | G06V 40/103 |
| 2023/0024371 A1* | 1/2023 | Ben Gigi | G08B 21/08 |

* cited by examiner

ANTI-DROWNING SAFETY ALARM METHOD AND DEVICE FOR SWIMMING POOL

TECHNICAL FIELD

The present invention relates to an anti-drowning supervision method, more specifically to an anti-drowning safety alarm method and device for swimming pools.

BACKGROUND

With the development of sports, people's enthusiasm to participate in sports activities is also increasing, and as one of the popular sports, swimming has become the highest incidence of safety accidents. According to the incomplete statistics released by the Ministry of Health, about 57,000 people die from drowning accidents in China every year, among which 56.04% are teenagers, becoming the most common cause of death, and China has the highest death rate from drowning in the world.

Object detection is involved in the anti-drowning supervision of swimming pools, and the main background of the object detection problem is water. The water will fluctuate when swimmers swim; sunlight and light will produce a reflection on the water surface, which is difficult to remove by preprocessing technology. In addition, the position of the reflection will change with the fluctuation of the water. Swimmers have a wide age and will show a variety of behaviors whether they are on the shore or in the pool. The part of the swimmers below the water is affected by the refraction, turbidity, and fluctuation of the water, which is difficult to observe. There will be a variety of facilities and debris such as stands, life-saving equipment, training equipment and swimmers' personal belongings on the pool shore, and a variety of floating objects such as lane lines and training equipment will also appear in the pool.

At present, the operation mode of most swimming venues is based on the traditional manual mode, which has high costs and incomplete supervision. The existing technology installs underwater cameras around and at the bottom of the swimming pools, and uses algorithms to judge whether swimmers are swimming normally or in the state of drowning. However, it can only detect and identify the anti-drowning for the human body. This method has low accuracy and cannot improve the accuracy of anti-drowning supervision.

Therefore, it is necessary to design a new method to realize the automatic supervision of the target human body in the swimming pool and improve the accuracy of anti-drowning supervision.

SUMMARY OF THE INVENTION

The purpose of the present invention is to overcome the defects of the prior art, and provide an anti-drowning safety alarm method, device, computer equipment and storage medium for the swimming pool.

In order to achieve the above purpose, the present invention adopts an anti-drowning safety alarm method for swimming pools, including the following steps:

Acquiring images taken by multiple cameras;
Inputting the images into a target detection model to detect human bodies and heads, so as to obtain human body target detection boxes and human head target detection boxes;
Calculating the relationship between the human heads and the human bodies according to the human body target detection boxes and human head target detection boxes, and integrating these boxes to obtain the bounding box sequence;
Performing multi-camera fusion on the human body target detection boxes and the human head target detection boxes to obtain the human body boxes and head boxes; Inputting these boxes into the relative position discrimination model to determine the relative position relationship between the human bodies or the human heads and the water surface, so as to obtain the relative position relationship sequence;
Calculating the correlation between the bounding box sequence at the current time and that at the previous moment by using these boxes and the relative position relationship sequence, so as to obtain the human tracking trajectory;
Updating the state database based on the bounding box sequence;
Generating alarm information according to the state database and sending the alarm information to the terminal.

The further technical proposal is as follows, the target detection model is obtained by training the convolutional neural network through several images with the location label of the human body target and the head target as the sample set, including the following steps:

Constructing images with human body target location labels and human head target location labels as a sample set;
Dividing the sample set to obtain the training set, verification set and test set;
Carrying out enhanced processing on the training set, validation set, and test set to obtain processed results;
Constructing the Yolov5 network, and adding the DLA-34 network, Semantic Self-Attention mechanism and Anchor-free network to the Yolov5 network to obtain the initial network;
Using the training set and verification set in the processed results to train and verify the initial network, and calculate the loss value of the training process;
When the loss remains unchanged, the test set in the processed result is used to test the initial network, so that the trained initial network is used as a target detection model.

The further technical proposal is as follows, the Yolov5 network is constructed, and the DLA-34 network, Semantic Self-Attention mechanism and Anchor-free network are added to the Yolov5 network to obtain the initial network, including the following steps:

Constructing the Yolov5 network;
Adding the DLA-34 network as the backbone network to the Yolov5 network, and extracting features to obtain the first network;
Adding the Semantic Self-Attention mechanism to the first network to obtain the second network;
Using the Anchor-free network in the target regression frame network of the second network to obtain the initial network.

The further technical proposal is as follows, the relationship between human heads and human bodies is calculated by the human body target detection boxes and human head target detection boxes, and these boxes are integrated to obtain the bounding box sequence, including the following steps:

The Hungarian algorithm is used to calculate the corresponding relationship between the human body target detection boxes and the human head target detection boxes, and these boxes and the corresponding relationship are combined to obtain the bounding box sequence.

The further technical proposal is as follows, the multi-camera fusion on the human body target detection boxes and the human head target detection boxes to obtain the human body boxes and head boxes includes the following steps:

Determining the reference camera image and the registration camera image; Using Zhang Zhengyou calibration method to calibrate the internal and external parameters of the reference camera and the registration camera;

Preprocessing the reference camera image and the registration camera image to obtain a local world coordinate system;

Calculating the relative pose between the reference camera and the registration camera;

Associating multiple cameras through the relative pose to establish a global unified world coordinate system;

Determining the position of each camera in the global unified world coordinate system to obtain the spatial pose of each camera;

Mapping the bounding box sequence into the three-dimensional world coordinate system, and calculating the matching degree of two boxes in different images according to the center point position of the human target detection boxes and the human head target detection boxes, and the size of the bounding boxes;

Screening out the body boxes and head boxes whose matching degree exceeds the threshold to obtain the body boxes and head boxes.

The further technical proposal is as follows, the human body boxes, the human head boxes and the relative position relationship sequence are used to calculate the correlation between the bounding box sequence at the current time and that at the previous time to obtain the human tracking trajectory, including the following steps:

Based on the human body boxes, head boxes and the relative position relationship sequence between them in two adjacent frames, we calculate the distance between two human bodies to obtain the distance matrix;

Based on the distance matrix, we calculate the matching relationship between the human body boxes of two adjacent frames by using the Hungarian algorithm, so as to obtain the human tracking trajectory.

The further technical proposal is as follows, the alarm information is generated according to the state database and sent to the terminal, including the following steps:

The drowning state is determined by the underwater time of the head boxes in the state data, and alarm information is generated according to the head boxes and body boxes in the drowning state and sent to the terminal.

An embodiment of the present invention additionally provides an anti-drowning safety alarm device for swimming pools, including the following components:

an image acquisition unit, which is used to acquire images taken by multiple cameras;

a target detection unit, which is used to input the images into a target detection model to detect human bodies and heads, so as to obtain human body target detection boxes and human head target detection boxes;

a relationship calculation unit, which is used to calculate the relationship between the human heads and the human bodies according to the human body target detection boxes and human head target detection boxes, and integrate these boxes to obtain the bounding box sequence;

a fusion unit, which is used to perform multi-camera fusion on the human body target detection boxes and the human head target detection boxes to obtain the human body boxes and head boxes;

a position sequence acquisition unit, which is used to input these boxes into the relative position discrimination model to determine the relative position relationship between the human bodies or the human heads and the water surface, so as to obtain the relative position relationship sequence;

an association unit, which is used to calculate the correlation between the bounding box sequence at the current time and that at the previous moment by using these boxes and the relative position relationship sequence, so as to obtain the human tracking trajectory;

an update unit, which is used to update the state database based on the bounding box sequence;

an alarm unit, which is used to generate alarm information according to the state database and send the alarm information to the terminal.

An embodiment of the present invention additionally provides an electronic device, including: a memory, a processor, and a computer program stored on the memory and executable on the processor. The processor implements the above methods when executing the computer program.

An embodiment of the present invention additionally provides a storage medium, where a computer program is stored on the storage medium, and when the computer program is executed by a processor, the method for warning against drowning as above described is implemented.

Compared with the prior art, the present invention has the following advantages: the present invention acquires the images taken by multiple cameras, detects the human body and the human head through the target detection model, and calculates the corresponding relationship so that the human body bounding box and its corresponding head bounding box belong to the same person; The human body target detection boxes and head target detection boxes are fused by multi-camera, and the bounding boxes detected in different images are aligned, so that the human body box and the head box belong to the same person. Secondly, the relative position relationship between the human body, the head, and the water surface is determined, and that of each person in the scene is recognized; The human body boxes, the human head boxes, and the position relationship are used as input to automatically track the human, the tracking results are sent to the terminal, and the state database is updated. The alarm information is generated according to the state database and sent to the terminal, so as to realize the automatic supervision of the target human in the swimming pool and improve the accuracy of anti-drowning supervision.

The above description is only an overview of the technical solutions of the present invention, in order to be able to understand the technical means of the present invention more clearly, it can be implemented according to the content of the description, and in order to make the above and other purposes, features and advantages of the present invention more obvious and easy to understand, the following specific embodiments and drawings of the present invention are given.

BRIEF DESCRIPTION OF THE DRAWINGS

In order to illustrate the technical solutions of the embodiments of the present invention more clearly, the following briefly introduces the drawings that are used in the description of the embodiments of the present invention. Obviously, the drawings in the following description are only some embodiments of the present invention, for those of ordinary skill in the art, other drawings can also be obtained based on these drawings without any creative effort.

DETAILED DESCRIPTION

The technical solutions in the embodiments of the present invention will be clearly and completely described below with reference to the accompanying drawings in the embodiments of the present invention. Obviously, the described embodiments are part of the embodiments of the present invention, but not all of the embodiments. Based on the embodiments of the present invention, all other embodiments obtained by those of ordinary skill in the art without creative efforts shall fall within the protection scope of the present invention.

It should be understood that when used in this description and the appended claims, the terms "comprising" and "including" indicate the presence of described features, integers, steps, operations, elements and/or components, but do not exclude the existence or addition of one or more other features, integers, steps, operations, elements, components and/or collections thereof.

It should also be understood that the terms used in this description of the invention are for the purpose of describing particular embodiments only and are not intended to limit the invention. As used in this description and the appended claims, the singular forms "a", "an" and "the" are intended to include plural referents unless the context clearly dictates otherwise.

It should also be further understood that the term "and/or" used in the description of the invention and the attached claims refers to any combination and all possible combinations of one or more of the associated listed items, and includes these combinations.

Figure 1:
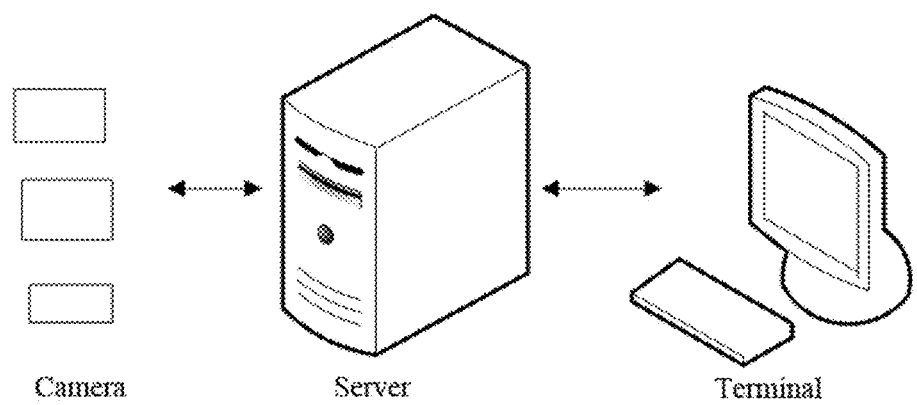
FIG. 1 is a schematic diagram of the application scene of the anti-drowning safety alarm method for swimming pools in an embodiment of the present invention.
Figure 2:
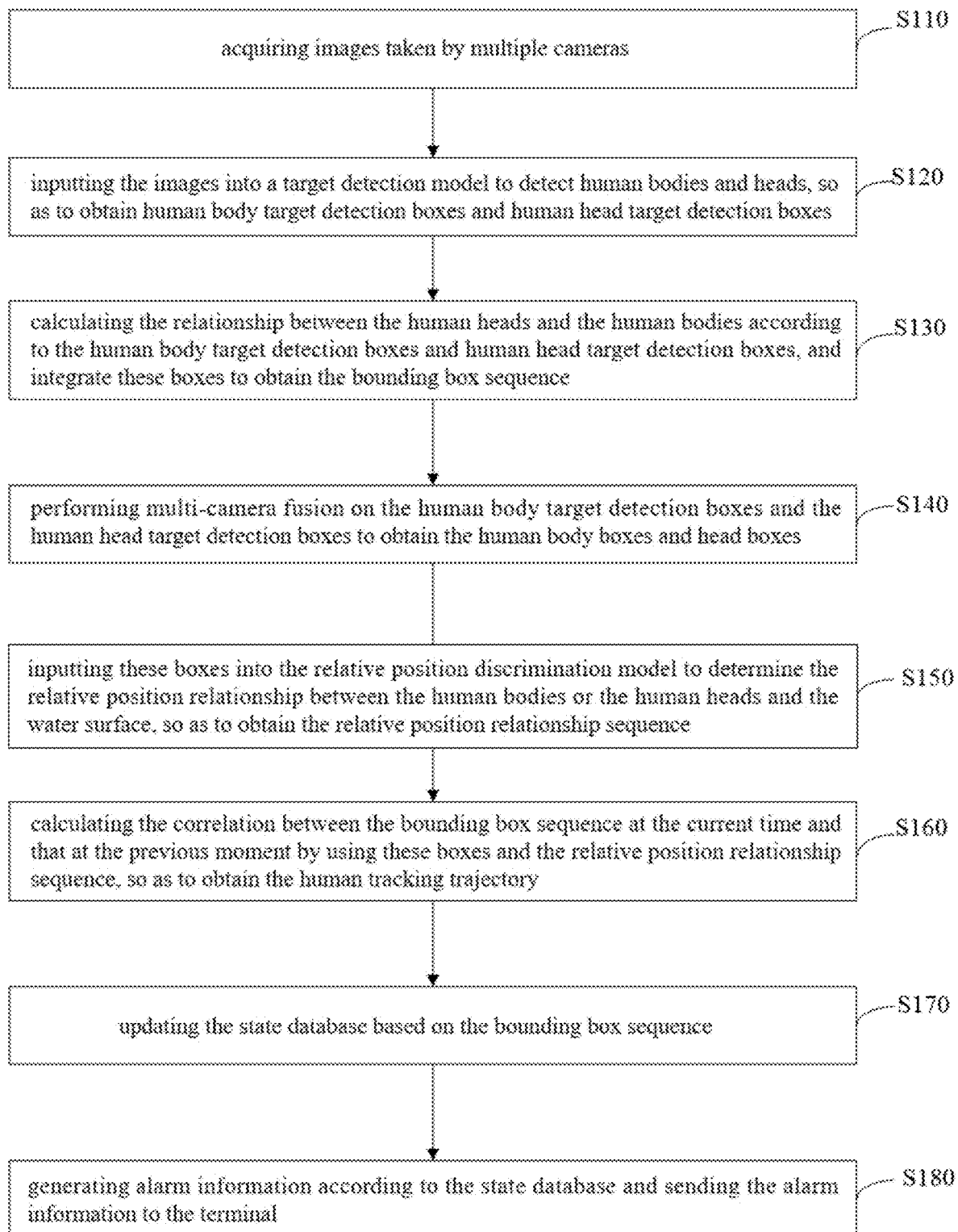
FIG. 2 is a schematic flowchart of an anti-drowning safety alarm method for swimming pools in an embodiment of the present invention.

Please refer to FIGS. 1 and 2. FIG. 1 is a schematic diagram of the application scene of the anti-drowning safety alarm method for swimming pools in an embodiment of the present invention. FIG. 2 is a schematic flowchart of an anti-drowning safety alarm method for swimming pools in an embodiment of the present invention; The anti-drowning safety alarm method for swimming pools is applied to the server. The server performs data interaction with multiple cameras and terminals respectively. The server acquires the images taken by multiple cameras, detects the human body and the human head through the target detection model, and calculates the corresponding relationship so that the human body bounding box and its corresponding head bounding box belong to the same person; The human body target detection boxes and head target detection boxes are fused by multi-camera, and the bounding boxes detected in different images are aligned, so that the human body box and the head box belong to the same person; The relative position relationship between the human body, the head, and the water surface is determined, and that of each person in the scene is recognized, then one of the three positions is selected as "above the water", "on the water" or "under the water"; The human body boxes, the human head boxes, and the position relationship are used as input to automatically track the human, the tracking results are sent to the terminal, and the state database is updated. The alarm information is generated according to the state database and sent to the terminal.

Based on six CCTV cameras deployed around the swimming pool, a streaming media server is constructed to pull the stream and obtain the real-time video frame sequence of the current moment. The sequence contains six images with a size of 1920×1080, and each image is from one camera. It stores the head and body state of all the people in the current pool within 1 minute. The database is connected to a real-time monitoring module, which queries the database in real-time and analyzes the swimming situation based on the state of the human head and the human body, and sends out an alarm when necessary.

FIG. 2 is a schematic flowchart of an anti-drowning safety alarm method for swimming pools in an embodiment of the present invention. As shown in FIG. 2, the method includes the following steps S110 to S180.

S110, acquiring images taken by multiple cameras.

In this embodiment, the image is what is captured by multiple cameras erected on the swimming pool.

Figure 7:
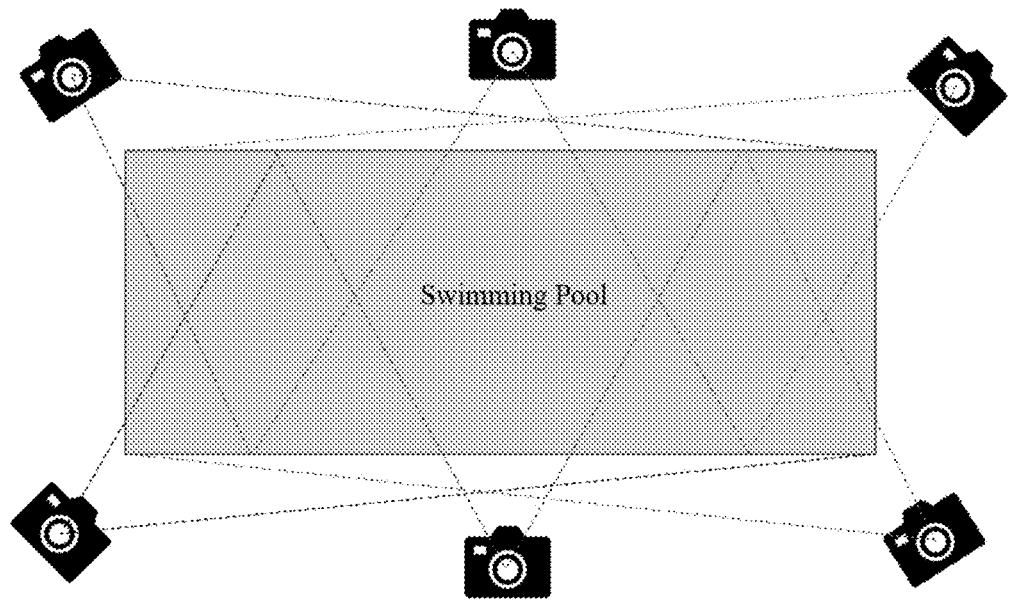
FIG. 7 is a schematic diagram of a camera layout in an embodiment of the present invention.

As shown in FIG. 7, multiple cameras are arranged at intervals above the swimming pool so as to photograph specific conditions of the whole swimming pool.

S120, inputting the images into a target detection model to detect human bodies and heads, so as to obtain human body target detection boxes and human head target detection boxes.

In this embodiment, the human body target detection boxes refer to the bounding boxes with coordinate information where the human body target is located; the human head target detection boxes refer to the bounding boxes with coordinate information where the human head target is located.

The target detection model is obtained by training the convolutional neural network through several images with the location label of the human body target and the head target as the sample set.

Specifically, the above model is obtained by training the convolutional neural network through several images with the location label of the human body target as the sample set, including the following steps S121 to S126.

S121, Constructing images with human body target location labels as a sample set;

In this embodiment, the sample set refers to several images of swimming pools, which are manually annotated with the positions of the human body target.

S122, Dividing the sample set to obtain the training set, verification set and test set.

In this embodiment, the sample set is divided and can be used for model training, verification and testing.

S123, Carrying out enhanced processing on the training set, validation set, and test set to obtain processed results.

In this embodiment, the processed result refers to the result formed after processing the training set, verification set, and test set by means of enhanced operations such as rotation and flipping.

The stability of the model can be improved by enhancing the training set, verification set and test set.

S124, Constructing the Yolov5 network, and adding the DLA-34 network, Semantic Self-Attention mechanism and Anchor-free network to the Yolov5 network to obtain the initial network.

In this embodiment, the initial network refers to the convolutional neural network formed by adding the DLA-34 network, the Semantic Self-Attention mechanism and the Anchor-free network to the Yolov5 network.

In an embodiment, the above step S124 may include steps S1241 to S1244.

S1241, Constructing the Yolov5 network;

S1242, Adding the DLA-34 network as the backbone network to the Yolov5 network, and extracting features to obtain the first network; In this embodiment, the first network refers to the network structure formed by adding the DLA-34 network as the backbone network to the Yolov5 network.

Based on the Yolov5 target detection model, DLA-34 in CenterNet is added as the Backbone for feature extraction. DLA (Deep Layer Aggregation) is an image classification network with multi-level jump connections, which can better aggregate information from different layers through deeper fusion. While DLA-34 uses DCN (Deformable Convolution Networks), DLA-34 as the network structure of multi-object tracking can integrate the feature information in an iterative way to get more effective information.

S1243, Adding the Semantic Self-Attention mechanism to the first network to obtain the second network.

In this embodiment, the second network refers to the network formed by adding the DLA-34 network as the backbone network to the Yolov5 network and adding the Semantic Self-Attention mechanism.

In the target detection model, SSA (Semantic Self-Attention) is also added. First of all, the self-attention mechanism is to process global information, while SSA uses the target detection boxes as the manually annotated ground truth for segmentation, and uses its learned segmentation features to fuse the features with the detection features, that is the attention-focused information, is then detected. The process is as follows: using the true detection boxes as the segmentation mask, learning the mask through convolution on the original feature map, and using the learned feature map as the attention-focused information, and fusing it into the original feature map.

S1244, Using the Anchor-free network in the target regression frame network of the second network to obtain the initial network.

In this embodiment, the Anchor-free algorithm is used in the final target regression box network. Based on the feature map with category information and position information, the bounding boxes where the final target is located can be obtained.

Figure 3:
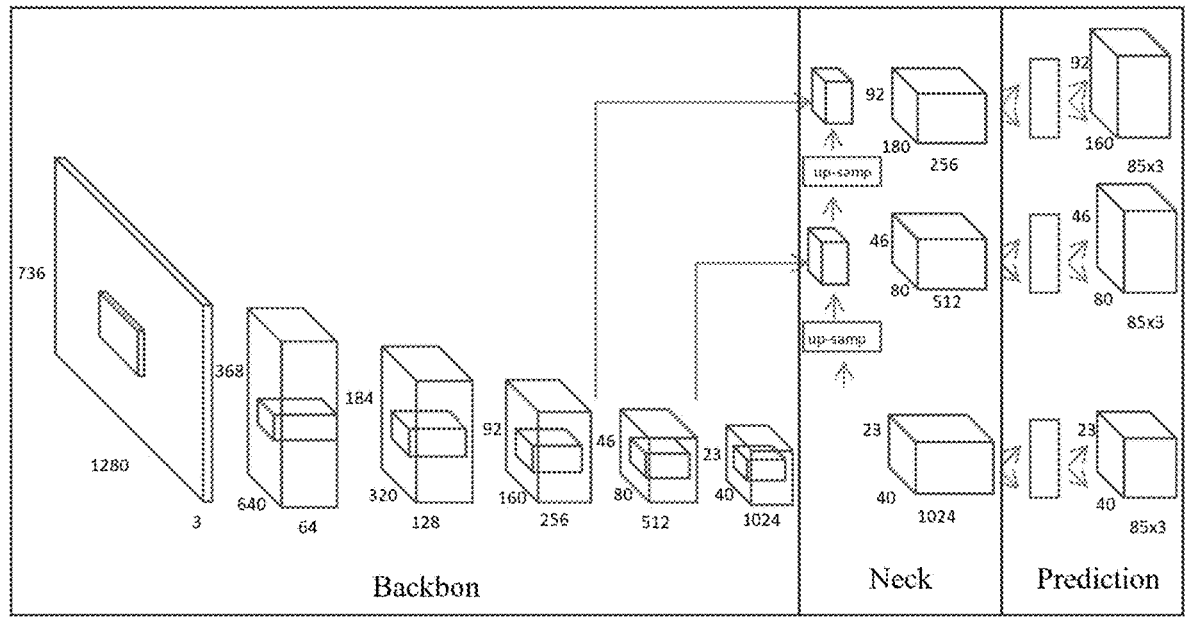
FIG. 3 is a schematic diagram of three scale feature maps generated by the target detection model in an embodiment of the present invention.

Specifically, the target box is the bounding box where the target is located, which is realized by the following program. As shown in FIG. 3, three scale feature maps are formed, the number below the convolutional layer is the number of channels, and the upper part is the two-dimensional image size, the size of the input image is 736×1280 with 3 channels. The feature maps of different scales are deepened with the convolutional layer, and the receptive art on the input image is different, that is, the grid size of the input image corresponding to the feature map is different.

During the inference of the target detection model, the category information predicted by each grid is multiplied by the confidence of the target box prediction to obtain the class-specific confidence score of each target box:

$$Pr(Class_i | Object) * Pr(Object) * IOU\frac{truth}{pred} = Pr(Class_i) * IOU\frac{truth}{pred};$$

the first item on the left side of the equation is the category probability of each grid prediction, and the second and third items are the confidence of each target box prediction. The product is the probability that the predicted target box belongs to a certain category, that is, the probability of the accuracy of the target box. After obtaining the class-specific confidence score of each target frame, we set the threshold, filter out the target frames with low scores, and perform NMS (non-maximum suppression) to get the final detection results; that is, the location of the human target in the swimming pool.

S125, Using the training set and verification set in the processed results to train and verify the initial network, and calculate the loss value of the training process.

In this embodiment, the loss value refers to the variance between the result obtained during the training process and the actual label.

S126, When the loss remains unchanged, the test set in the processed result is used to test the initial network, so that the trained initial network is used as a target detection model.

When the loss value remains unchanged (the loss value is basically unchanged and very small), that is, the current network has converged, which also indicates that the current network can be used as a candidate target detection model. Generally, the loss value is relatively large at the beginning of training, and the later the training, the smaller the loss value is. If the loss value does not remain unchanged, it indicates that the current network cannot be used as a candidate target detection model, that is, the detected result is not accurate, which will lead to the inaccurate classification of the later interference signal; If the loss value is not maintained unchanged, the parameters of each layer of the network will be adjusted, and the sequence will be input into the network to train the network.

S130, The relationship between human heads and human bodies is calculated by the human body target detection boxes and human head target detection boxes, and these boxes are integrated to obtain the bounding box sequence.

In this embodiment, the bounding box sequence refers to the head boxes, the human body boxes, and the corresponding relationship between the human head and the human body.

Specifically, the Hungarian algorithm is used to calculate the corresponding relationship between the human body target detection boxes and the human head target detection boxes, and these boxes and the corresponding relationship are combined to obtain the bounding box sequence.

In an embodiment, the above target detection model coupled with the calculation of the relationship between the human head and the human body can be replaced by a joint detection model.

Figure 8:
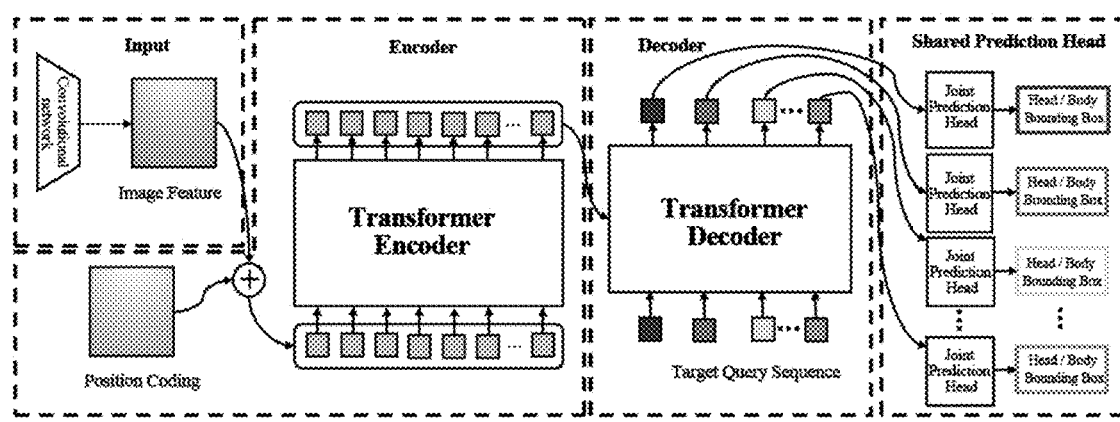
FIG. 8 is a schematic diagram of a joint detection model in an embodiment of the present invention.

Specifically, as shown in FIG. 8, the joint detection model is obtained by training a convolutional neural network with several head box labels and body box labels as the sample sets, and calculating the corresponding relationship between the human head and the human body in combination with the Hungarian algorithm.

The joint detection model detects the human head and human body bounding box in each image, and automatically calculates the corresponding relationship between them, so that the human body bounding box and the corresponding human head bounding box belong to the same person.

To obtain the training data for the joint detection model shown in FIG. 8, 5000 images were taken from the actual swimming pool video surveillance scene, and then these images were annotated with data on the head bounding box, the body bounding box, and the three relative positions of the head or body to the water surface for each person in each image, including "above the water", "on the water" and "under the water".

In an embodiment, the above-mentioned joint detection model may specifically include the following steps when performing steps S120 and S130:

Extracting the feature map of the image using the ResNet50 convolutional network.

In this embodiment, the input to the model is an RGB color image of a swimming pool of size 1300×800, which is the image described above, and the feature map of the input image is first extracted using the ResNet50 convolutional network of size 325×200.

The feature map is flattened to obtain the vector.

In this embodiment, the feature map is flattened into a vector with a length of 65000.

The vector is summed with a sine and cosine position encoding vector and input to a Transformer encoder for encoding to obtain a feature vector.

In this embodiment, the feature vector is the result of encoding the pointing vector and the sine and cosine position encoding vector into the Transformer encoder.

Specifically, the vector is added to the sine and cosine position encoding vector commonly used in the art and fed to the Transformer encoder, which then encodes the input and outputs a feature vector with the same length of 65000 and carrying semantic information.

The feature vector is fed to a Transformer decoder and decoded in combination with the received target query sequence to obtain the key feature vector.

In this embodiment, the key feature vector is the result of the decoding calculation of the feature vector in combination with the received target query sequence.

The feature vector obtained in the previous step is input to a Transformer decoder which also receives as input a target query sequence containing a total of 100 query vectors learned from the training data, supporting the detection of up to 100 swimmers; the decoder performs classical Transformer decoding computation on the input feature vectors and the query sequence, and outputs 100 key feature vectors with the length of 65000, each of which contains key information required for head and body detection.

The key feature vectors are fed to a prediction head with shared parameters to obtain detection results, where the prediction head contains a head box regressor, a human box regressor, and a foreground/background classifier.

In this embodiment, the detection results refer to the head bounding box as well as the body bounding box.

These key feature vectors are input to a prediction head with shared parameters, which contains a head box regressor, a body box regressor, and a foreground or background classifier. The regressor is responsible for calculating the center point coordinates and the width and height of the head and body bounding boxes, and the classifier is responsible for discerning the probability that the detection result of this query is a human, called the foreground confidence level. Since the actual number of people in the swimming pool may be less than 100, after obtaining the output of the joint head and body detection model, it is also necessary to filter the detection results according to the foreground confidence corresponding to each detection output to improve the accuracy of the detection results.

The non-maximum suppression technique is used to remove overlapping detection content from the detection results to obtain joint head and body detection results, i.e., human body target detection boxes as well as the human head target detection boxes.

In this embodiment, the joint human head body detection result is the non-overlapping human body target detection box as well as human head target detection box.

The classical non-maximum suppression is used to remove the overlapping detection content and output the final joint head and body detection results.

The Hungarian algorithm is used to calculate the corresponding relationship between the human head and the human body in the joint head and body detection results, and the corresponding relationship between the joint the human head and the human body are combined to obtain the bounding box sequence.

To train the joint detection model as shown in FIG. 8, head and body box annotations as well as head and body corresponding relationship annotations are required. To reduce the annotation workload and data collection cost, this invention only needs to annotate the human head and human body edit boxes, and the corresponding relationship between the human head and the human body is obtained by using the Hungarian algorithm to calculate the maximum match between the human head and human body, the core of which is to calculate the matching cost between anyone ("human head", "human body") pair between the matching cost. This patent defines the cost as the area of the "intersection" between the human head and the human body divided by the area of the human head.

To achieve effective training of the model, the ResNet50, Transformer encoder, and decoder in the model are first pre-trained at MS-COCO 2017, and then all network model parameters are fine-tuned, with the AdamW optimizer used for fine-tuning, the initial learning rate is set to $10^{-4}$, Weight Decay parameter is set to $10^{-4}$, Batch Size is set to 24, and Epoch is set to 300.

S140, the human body target detection boxes and the human head target detection boxes are fused with multiple cameras to obtain the human body boxes and the human head boxes.

In this embodiment, the human body box and the human head box refer to the results obtained after multi-camera fusion of the human body target detection box and human head target detection box to perform alignment processing of the human body target detection box and the human head target detection box.

In an embodiment, the above step S140 may include steps S141 to S148.

S141, determining the reference camera image and the registration camera image.

In this embodiment, the reference camera image is an image taken by a camera as a reference, and the registration camera image is an image taken by a registration camera; any camera among multiple cameras can be used as a reference camera for other cameras and as a registration camera for other reference cameras.

S142, calibrating the reference camera and the internal reference of the registration camera.

In this embodiment, the internal reference refers to the internal reference of the camera.

Specifically, the internal reference of the reference camera and the registration camera is obtained by the Zhang Zhengyou calibration method.

S143, the reference camera image and the registration camera image are pre-processed to obtain a local world coordinate system.

In this embodiment, the local world coordinate system is a coordinate system defined according to the reference camera as well as the registration camera.

In an embodiment, the above step S143 may include the following steps:

Correcting the image distortion for the reference camera image and the registration camera image to obtain a correction result.

In this embodiment, the correction result is the image obtained after the removal of the distortion of the corrected image for the reference camera image and the registration camera image.

A local world coordinate system is defined according to a group of two cameras.

Specifically, a metric scale local world coordinate system w is defined, i.e., the corner point of the upper left corner of the checkerboard grid is the origin of the x-y plane, and the plane where the checkerboard grid is located in the plane of z=1. Since this coordinate system has a real scale, the system can easily obtain the 3D coordinates of the checkerboard grid corner points. By matching the checkerboard grid corner points and the formula of pixel error for projecting the 3d points under the local coordinate system to the 2D pixel plane, we can provide measurable scale constraints for the optimization problems of the camera external reference and the inverse depth of the feature points. In addition to the checkerboard grid corner points, the system also extracts SIFT feature points and all line segment features in the pools to provide richer constraints for the optimization problem of the camera external reference and the inverse depth of the feature points based on graph optimization, making the geometric transformation $R_{c1-w}$, $t_{c1-w}$, $R_{c2-w}$, $t_{c2-w}$ and feature point depth A obtained from optimization more robust.

S144, calculating the relative poses between the reference camera and the registration camera.

In this embodiment, the relative poses are the relative positions of the reference camera and the registration camera in the corresponding local world coordinate system.

Specifically, the relative poses of the reference camera and the registration camera in the corresponding local world coordinate system are calculated by minimizing the error based on the correction results fusing the constraints of linear matching and feature point matching.

In an embodiment, the above step S144 may include the following steps:

Calculating the pixel error of projecting the 3d point in the local world coordinate system to the 2D pixel plane based on the correction result;

Calculating the reprojection error of the matched point pairs in the pixel plane of the reference camera and the registration camera based on the correction results.

In this embodiment, the specific constraints of the optimization problem are shown below, where h[.] denotes the conversion of 3d points to 3d flush coordinates, g{.} denotes the conversion of 3d flush coordinates to 2d coordinates, f(.) denotes the conversion of 2d pixel coordinates (u, v) to 3d flush coordinates (u, v, 1), $e_{3d}'$, $e_{3d}''$, $e_{2d}$ denote three projection residuals with dimensions of 2*1, 2*1, 2*1, respectively. $e_{3d}'$ and $e_{3d}''$ denotes the pixel error of the projection of 3d points in the local coordinate system into the 2d pixel plane, $e_{2d}$ denotes the reprojection error of matched point pairs in the two cameras pixel plane. The specific calculation is as follows: $e_{3d}'=g\{h[K_{c1}(R_{c1-w}*P_w^{3d}+t_{c1-w})]\}-P_{c1}^{2d-un}$; $e_{3d}''=g\{h[K_{c2}(R_{c2-w}*P_w^{3d}+t_{c2-w})]\}-P_{c2}^{2d-un}$;

$$e_{2d} = g\left\{K_{c2}\left\{R_{c2-w}*R_{c1-w}^{-1}\left[K_{c1}^{-1}*\frac{1}{\lambda}*f\left(P_{c1}^{2d-un}\right)-t_{c1-w}\right]+t_{c2-w}\right\}\right\}-P_{c2}^{2d-un};$$

where K, R and t denote the 3*3 camera internal reference matrix, the 3*3 rotation matrix, and the 3*1 translation vector, respectively, and the subscripts represent the coordinate system where they are located, e.g., $R_{c-w}$ denotes rotation from the world coordinate system w to the camera coordinate system c1, $t_{c2-w}$ denotes translation from the world coordinate system w to the camera coordinate system c2, and the superscript −1 of the matrix denotes the inverse of the matrix. P, X and Y denotes the coordinates of the point, the superscript is 2d-un, which denotes a 2D pixel point that is eliminating distortion, and the subscript c1 and c2 denotes that the point is a pixel point on the corresponding camera coordinate system.

According to the correction result, the vertical distance from the endpoint of the projection of the registration camera to the line formed by joining the actual endpoints is calculated, and two new distance errors are obtained.

Specifically, given $X_{c1,j}^{2d-un}$ and $Y_{c1,j}^{2d-un}$ denotes the endpoint of the jth line feature under the c1 camera coordinate system, $X_{w,j}$ and $Y_{w,j}$ are calculated according to $$X_{w,j} = R_{c1-w}^{-1}\left[K_{c1}^{-1}*\frac{1}{\lambda}*f\left(X_{c1,j}^{2d-un}\right)-t_{c1-w}\right] \text{ and}$$

$$Y_{w,j} = R_{c1-w}^{-1}\left[K_{c1}^{-1}*\frac{1}{\lambda}*f\left(Y_{c1,j}^{2d-un}\right)-t_{c1-w}\right],$$

$X_{w,j}$ and $Y_{w,j}$ denote the three-dimensional space points of two-dimensional pixel points $X_{c1,j}^{2d-un}$ and $Y_{c1,j}^{2d-un}$ in the world coordinate system w, and then homogeneous coordinate is obtained by projecting $X_{c2,j}^h=h[K_{c2}(R_{c2-w}*X_{w,j}+t_{c2-w})]$ and $Y_{c2,j}^h=h[K_{c2}(R_{c2-w}*Y_{w,j}+t_{c2-w})]$ onto the camera coordinate system c2. Thus, we can calculate the characteristic parameters of the line $$l_{c2} = \frac{X_{c2,j}^h \times Y_{c2,j}^h}{\left|X_{c2,j}^h \times Y_{c2,j}^h\right|}.$$

And the jth line feature endpoint is obtained directly from the picture acquired from the c2 camera as $X_{c2,j}^{2d\text{-}un}$ and $Y_{c2,j}^{2d\text{-}un}$, then calculate the perpendicular distance from the endpoints of the projection $X_{c2,j}^{h}$ and $Y_{c2,j}^{h}$, to the line joined by the actual endpoints $X_{c2,j}^{2d\text{-}un}$ and $Y_{c2,j}^{2d\text{-}un}$, respectively, to get two new distance errors $e_j'=(I_{c2})^{T}*(K_{c2}^{-1}*f(X_{c2,j}^{2d\text{-}un}))$ and $e_l''=(I_{c2})^{T}*(K_{c2}^{-1}*f(Y_{c2,j}^{2d\text{-}un}))$.

Wherein, the c2 camera is the registration camera; the c1 camera is the reference camera.

The pixel error, the reprojection error, and the two new distance errors are summed, and the relative poses of the reference camera and the registration camera in the corresponding local world coordinate system are calculated by minimizing error sum.

Specifically, the sum of the pixel error, the reprojection error, and the two new distance errors, which are five kinds of errors, can fuse the constraints of line matching and feature point matching, and the poses of each pair of cameras obtained in the artificially defined world coordinate system w can be calculated by minimizing the error sums separately.

S145, a plurality of cameras are associated by the relative poses to establish a global unified world coordinate system.

In this embodiment, the global unified world coordinate system is the spatial coordinate system to which all cameras are referenced.

By determining the relative poses of the reference camera and the registration camera in the corresponding local world coordinate system, the geometric transformation between the cameras can be calculated to establish a globally uniform world coordinate system W.

S146: The positions of each camera in the global unified world coordinate system are determined to obtain the spatial poses of each camera.

In this embodiment, the spatial poses of the individual cameras refer to the positions of the individual cameras under the global unified world coordinate system. By artificially defining camera 1 as the origin of the world coordinate system W, i.e., the poses are unit matrix $R_{c1\_w}=E$ and $t_{c1\_w}=(0,0,0)^{T}$. Subsequently, based on the relative poses $R_{c1\_c2}$ and $t_{c1\_c2}$ between cameras 1 and 2, the poses of camera 2 $R_{c2\_w}=R_{c1\_c2}^{T}$ and $t_{c1\_w}=-R_{c1\_c2}^{T}*t_{c1\_c2}$ in W is calculated. This is repeated several times so as to obtain the poses of the plurality of cameras in W, respectively.

S147, mapping the sequence of bounding boxes into the three-dimensional world coordinate system, and calculating the matching degree of two boxes in different images based on the center point position of the human body target detection box and human head target detection box, and the size of the bounding boxes.

In this embodiment, the matching degree refers to the matching degree of the human body box and the human head box in different images to ensure that the high matching degree belongs to the same person.

S148, The human body box and human head box whose match degree exceeds the set threshold are screened out to obtain the human body box and human head box.

In this embodiment, the "Zhang Zhengyou calibration method" is used to calculate the internal and external parameters of the six cameras, reconstruct the scene in 3D, build a unified 3D world coordinate system, i.e., the global unified world coordinate system, and map all detected human head boxes to this coordinate system, then calculate the matching degree of two boxes in different images based on the center point position, the size of the bounding box and other information, and set a threshold value β, and when the matching degree is greater than β, the corresponding two bounding boxes belong to the same person, so that for a person, up to six bounding boxes from different cameras can be obtained.

S150, the human body box and the human head box are input into the relative position discrimination model for the determination of the relative position relationship between the human body and the human head and the water surface to obtain the relative position relationship sequence.

In this embodiment, the relative position relationship sequence refers to the relative position relationship between the human body and the human head and the water surface.

The relative position discrimination model is obtained by training the convolutional network with a number of human head images with relative position relationship labels as a sample set.

Figure 9:
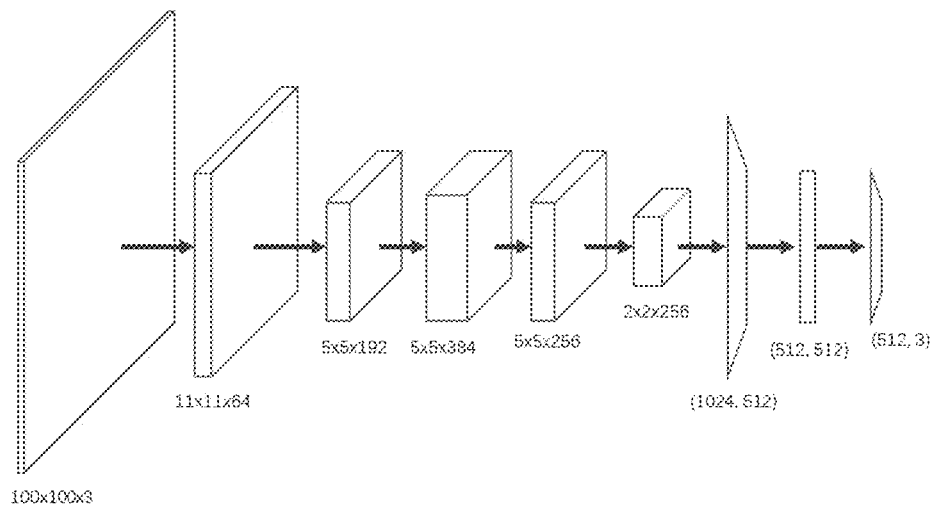
FIG. 9 is a schematic diagram of a relative position discrimination model in an embodiment of the present invention.

Referring to FIG. 9, the architecture of the convolutional network model for identifying the relative position of the human head or human body to the water surface, i.e., the relative position discrimination model, is shown in FIG. 9. The input to the network is a 100×100×3 image of a human head or body, where 100 is the width and height of the image and 3 denotes the three channels of the color image. To obtain an image with a uniform size of 100×100, for the human head, the original human head frame is first converted into a square box with the same center as the original bounding box and the side length equal to the maximum side length of the original bounding box. Then the head image is cropped from the video frame based on the converted bounding box, and finally, the image is scaled to a size of 100×100 using the classical "bilinear interpolation" method in "digital image processing"; for the human body, the human image is directly cropped based on the human body box and then scaled to a square image of size 100×100.

The forward propagation computational process of the above convolutional network, i.e., the relative position discrimination model, consists of eight steps: Step 1: The input image is processed by a convolutional operation with a convolutional kernel of size 11×11, a step size of 4, and a fill parameter of 2. Then, a maximum pooling operation with a pooling kernel size of 3×3 and a pooling step of 2 is performed on the feature map, and then the ReLU function is used to perform a nonlinear mapping of the pooling result to output a feature map of size 11×11×64, where 11 is the width and height of the feature map and 64 is the number of channels of the feature map; Step 2: A convolution operation with a convolution kernel of size 5×5, a step size of 1 and a fill parameter of 2 is used to process the feature map output in Step 1. Then, the maximum pooling operation with a pooling kernel size of 3×3 and a pooling step of 2 is executed on the feature map, and then the ReLU function is used to perform a nonlinear mapping of the pooling result to output a feature map of size 5×5×192, where 5 is the width and height of the feature map, and 192 is the number of channels of the feature map; Step 3: A convolution operation with a convolution kernel with size of 3×3, a step size of 1, and a fill parameter of 1 to process the feature map output in Step 2, and then use the ReLU function to perform a nonlinear mapping of the output of the convolution operation to output a feature map of size 5×5×384, where 5 is the width and height of the feature map, and 384 is the number of channels of the feature map; Step 4: Use a convolution kernel of size 3×3, a step size of 1, and a fill parameter of 1 to process the feature map output in Step 3, and then use the ReLU function to perform a nonlinear mapping of the output of the convolution operation and output a feature map of size 5×5×256, where 5 is the width and height of the feature map and 256 is the number of channels of the feature map; Step 5: Use a convolution kernel of size 3×3, a step size of 1, and a fill parameter of 1 to process the feature map output in Step 4, and then perform a maximum pooling operation with a pooling kernel size of 3×3 and a pooling step of 2, and then use the ReLU function to perform nonlinear mapping of the output of the convolution operation to output a feature map of size 2×2×256, where 2 is the width and height of the feature map and 256 is the number of channels of the feature map; Step 6: Use the linear function to map the feature map output in Step 5 to a feature vector of length 512, and use the ReLU function to perform a nonlinear mapping of the output of the convolution operation; Step 7: Use a linear function to map the feature vector output from Step 6 to a feature vector of the same length, and then use the ReLU function to perform a nonlinear map to this vector; Step 8: Use a linear function to map the feature vector output from Step 7 to a fractional vector of length 3, noted as s. The system uses r=argmax$_{i=1,2,3}$(S$_i$) to obtain the relative position relationship between the target and the water surface r∈{1,2,3}; here, S$_i$ denotes the i$^{th}$ component of the vector s. Here, r=1 denotes "above the water", r=2 denotes "on the water", r=3 denotes "under the water".

The convolutional network model is trained based on the "batch random gradient descent algorithm" with a batch size of 64. To improve the generalization performance of the model, each batch of training data is routinely augmented by randomly rotating the image by 0~±10°, randomly flipping horizontally, randomly scaling and cropping, randomly changing the color, etc. Before training, the parameters of the convolutional network model are randomly initialized, and the initial learning rate is set to $10^{-4}$. And the learning rate is set to 0.1 times the original learning rate decaying every 100 generations, the total number of training generations is set to 400, and the loss function is set to classical cross-entropy loss.

In an embodiment, the above-mentioned step S150 may further be achieved by the following steps:

Calculating a plane coordinate equation of the pool water surface in space based on the total image to obtain a spatial expression of the horizontal surface.

In this embodiment, the spatial expression of the water surface is the plane coordinate equation of the pool water surface in space, which is the space under the global unified world coordinate system.

In an embodiment, the above plane coordinate equation of the pool water surface in space is calculated according to the total image to obtain the spatial expression of the water surface which may include the following steps:

Mask the total image and extract the water surface feature points of the image captured by the camera to obtain the feature points.

In this embodiment, a feature point is a water surface feature point in the image captured by the camera.

Determine the 3D coordinates of the feature points.

As a result of the previous multi-camera spatial fusion step, the transformation matrix between the individual camera poses, i.e., the spatial poses of the individual cameras, has been obtained. Therefore, after adding the mask to the image, and extracting and matching the water surface feature points of the two camera images, the 3D coordinates of the feature points can be obtained by triangulation, and the scale of the 3D coordinates is consistent with the scale of the relative poses between the cameras, i.e., the true metric scale.

Construct the spatial expression and optimize the spatial expression using the three-dimensional coordinates of the feature points to obtain the spatial expression of the water surface.

In this embodiment, the spatial expression of the water surface is Ax+By+Cz=D, where, $$(A, B, C, D) = \arg\min_{(A,B,C,D)} \sum_{i=0}^{n} e_i,$$

$e_i$ is the residual error.

The water surface can be fitted through the three-dimensional coordinates of three or more non-collinear feature points, and the mathematical expression of the water surface is Ax+By+Cz=D. However, due to the large parallax between cameras pairs in the pool and the similar environment of the water surface of the pool, most of the matched point pairs obtained are wrong, when using RANSAC algorithm to SIFT features, the correct matching point pairs cannot be screened. By the idea of a human in the loop, the correct matching point pairs can be screened to recover the spatial coordinates of the feature points. However, due to the large parallax between camera pairs in the pool and the long distance of the cameras from the water surface, the spatial coordinates recovered from the distant water surface points have errors, which leads to errors in the final fitting plane parameters.

In order to improve the plane fitting accuracy, an optimization problem is constructed. Since multiple cameras can co-view the plane, the distance from the plane point ($x_i$, $y_i$, $z_i$) to the plane should be 0. The system constructs an optimization problem, whose residuals is $e_i = A*x_i + B*y_i + C*z_i - D$, to optimize the plane parameters. With (A, B, C, D) as the parameter, the pool water surface calculation is to extract n matching feature points on the water surface, according to the calculated three-dimensional coordinates, the parameters of the water surface are optimized by minimizing the following formula $$(A, B, C, D) = \arg\min_{(A,B,C,D)} \sum_{i=0}^{n} e_i.$$

According to the head box under different cameras combined with the spatial pose of each camera for multi-camera head position matching, in order to get the head spatial position.

In this embodiment, the headspace position is the specific position of the pool where the head is located.

In an embodiment, the above matching of the head positions of multiple cameras according to the head boxes under different cameras combined with the spatial pose of each camera to obtain the head spatial position can include the following steps:

By using the natural area division of the swim lane and the prior information of camera orientation based on the spatial poses of each camera, the pixel of the head box is mapped to a certain area of the pixel plane of other cameras to get the target region.

In this embodiment, the target region is this region corresponding to mapping the pixels of the current human head box to a certain region of the pixel planes of the other cameras.

Determine the confidence that the individual cameras have detected the human head under the target region based on the regional confidence prior to multiple cameras.

In this embodiment, the confidence level of the human head is the probability that the individual cameras can detect the human head in this target region.

Screen the three cameras with the highest confidence level, and determine the camera orientation prior to obtaining the target camera.

Divide the target region and the neighborhood of the target region to retrieve the head box corresponding to the target camera.

Determine the three-dimensional coordinates of the target camera corresponding to the human head box in a unified spatial coordinate system to obtain the human head spatial location.

In this embodiment, the unified spatial coordinate system refers to the global unified world coordinate system.

The camera orientation prior refers to the position of the camera in the uniform spatial coordinate system.

Figure 6:
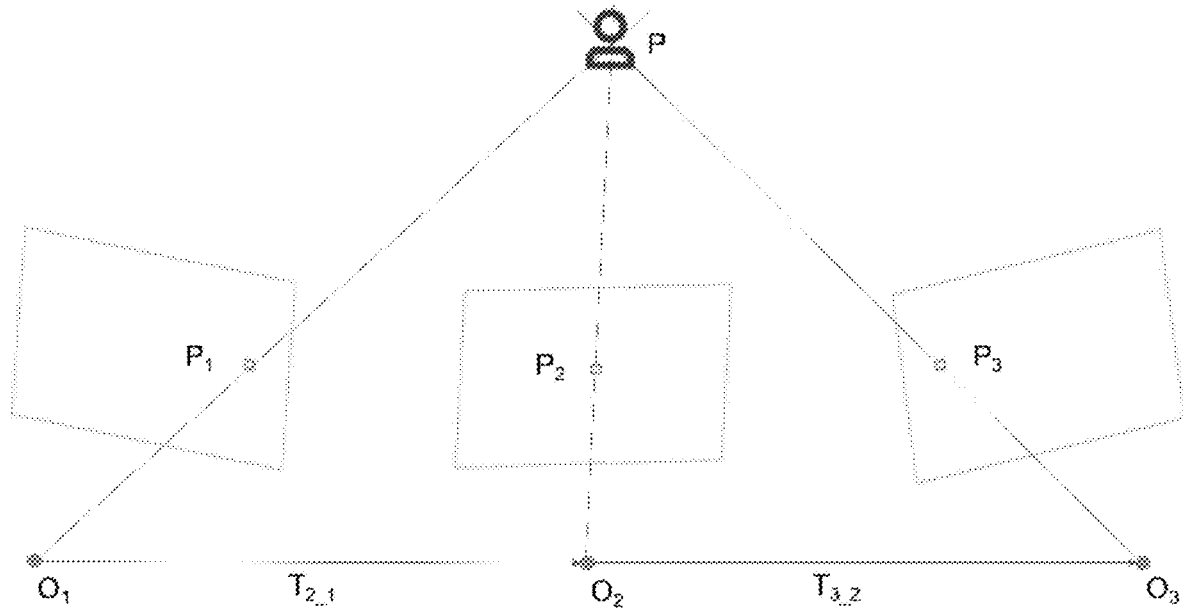
FIG. 6 is a schematic diagram of the determination of a headspace position in an embodiment of the present invention.

Due to the wide camera art of view and large parallax between multiple cameras, multi-camera pixel space mapping is difficult, therefore, hierarchical region mapping is proposed in the multi-camera fusion technology. As shown in FIG. 6, with the help of the natural region division of swim lanes and prior information of camera orientation, it is possible to map the target pixel to a region of the pixel plane of other cameras. Then, according to the regional confidence priors of multiple cameras, the confidence of each camera to detect the head in this region is judged, and the highest three cameras with the highest regional confidence are filtered out. Further, based on the orientation priori of the selected camera, the region and its neighborhood are finely divided, and the matched heads are retrieved. Then, the three-dimensional coordinates of the head in the unified spatial coordinate system P can be obtained by triangulating the pixel points $P_1$, $P_2$ and $P_3$, i.e., the human head spatial position.

Calculate the distance between the headspace position and the water surface and the direction of the normal vector of the water surface to obtain the calculation results.

In this embodiment, the calculation result is the distance of the head spatial position to the water surface and the direction of the head located in the normal vector of the water surface.

Specifically, the distance of the human head to the water surface and the direction of the normal vector located on the water surface are calculated based on the spatial expression of the spatial position of the human head and the water surface to obtain the calculation result.

Determine the relationship between the position of the human head and the water surface based on the calculation results.

Based on the spatial position of the human head (x1, y1, z1) and the spatial expression of the water surface, it is possible to calculate the distance from the human head to the water surface d, and the direction of the normal vector on the water surface (A, B, C), noted as F. The combination of F and d can determine the state of the human head and the water surface, i.e., above the water, under the water and on the water surface, so as to achieve the efficacy of early alarm.

Combining the distance d from the human head to the water surface, and the direction of the normal vector (A, B, C) on water surface, it can be comprehensively judged which state the human head is located above the water, under the water and on the water.

After the head target detection by multiple cameras, the head position matching is performed by combining the head box and multi-camera spatial fusion technology to determine the head spatial position, and calculate the distance from the head spatial position to the water surface and the direction of the normal vector on the water surface, so as to determine the relationship between the head and the water surface, and realize automatic monitoring of the relationship between the position of the human head and the water surface in the swimming pool, improve the efficiency of alarm and the accuracy of alarm against drowning.

S160, according to the human body box, the head box and the relative position relation sequence, calculate the correlation between the bounding box sequence of the current time and the bounding box sequence of the previous time to obtain the human tracking trajectory.

In this embodiment, the human tracking trajectory is the trajectory of the human body movement.

In an embodiment, the above step S160 may include steps S161 to S162.

S161, the distance between every two human bodies between the two adjacent frames is calculated according to the bounding boxes sequence after the alignment of the two adjacent frames and the relative position relation sequence to obtain a distance matrix.

In this embodiment, the distance matrix is a matrix consisting of the distances between every two human bodies.

Figure 10:
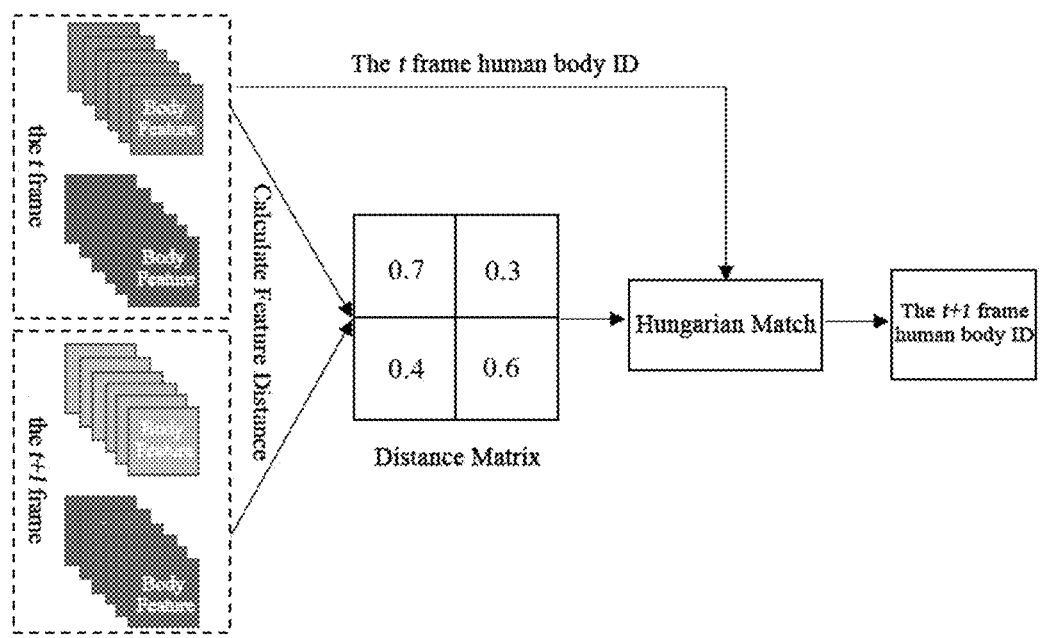
FIG. 10 is a schematic diagram of human tracking trajectory calculation in an embodiment of the present invention.

Specifically, as shown in FIG. 10, the human bodies in the two adjacent frames are tracked, and for each human body, its depth detection feature is extracted to obtain accurate tracking results, after which for human body a in frame t and human body b in frame t+1, their distances are calculated as:

$$r_{a,b} = \frac{\phi_a \cdot \phi_b}{\sqrt{L}} + \lambda \frac{d_{a,b}}{D},$$

φ denoting the extracted feature of a certain human body using the joint detection model, $d_{a,b}$ denoting the Euclidean distance representation of the two human bodies corresponding to a and b in the three-dimensional coordinate system, L denoting the length of the human body feature vector, and D denoting the length of the pool diagonal, λ is an adjustable constant.

S162, the distance matrix is used to calculate the matching relationship of the human body boxes of two adjacent frames using the Hungarian matching algorithm to obtain the human tracking trajectory.

Based on $$r_{a,b} = \frac{\phi_a \cdot \phi_b}{\sqrt{L}} + \lambda \frac{d_{a,b}}{D}$$

calculating the distance between every two human bodies between two adjacent frames, to obtain a distance matrix, and then the matrix is input to the classical Hungarian matching algorithm to obtain the matching relationship between the human body box in frame t+1 and frame t. The ID of the human body and human head in frame t+1 is also obtained, so that the tracking of the human body and human head targets is achieved.

The detection, tracking, human pose estimation and behavior recognition of the person in the frame are accomplished by the camera stream. The algorithm recognition software can determine what condition a swimmer is drowning in, which will trigger an alarm countdown state. After a short countdown, a drowning alarm is sent directly to the pool lifeguard, allowing for an earlier alarm to the lifeguard if a potential drowning event occurs than in a pool without this technology.

In another embodiment, target tracking can also be performed using the DeepSORT algorithm when performing human motion trajectory tracking to obtain human tracking trajectories.

Figure 4:
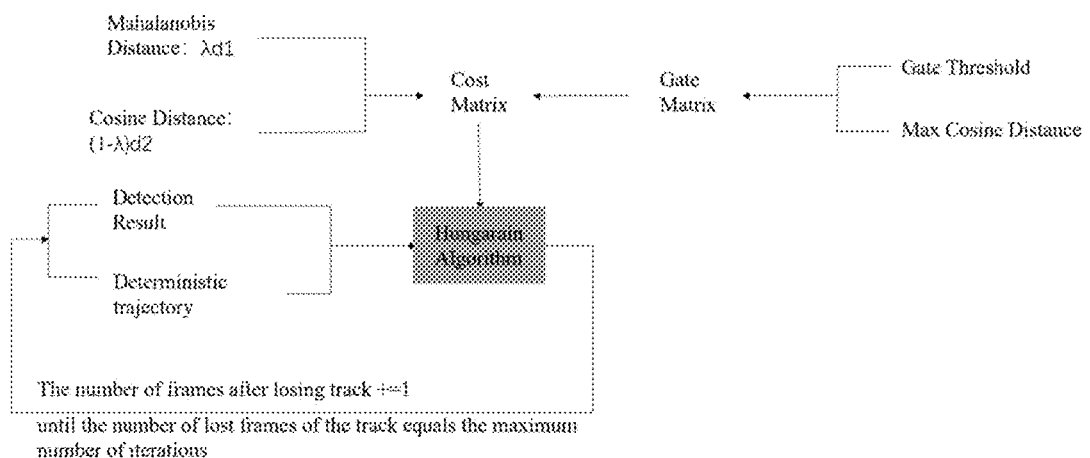
FIG. 4 is a schematic diagram of cascade matching in an embodiment of the present invention.

Referring to FIG. 4, a fusion of target apparent features, motion trajectory, and spatial location relationship enables cross-camera target matching tracking. The detection and tracking of people in the frame is combined with human pose estimation and behavior recognition. The algorithm recognition software can determine when a swimmer is drowning, which will trigger an alarm countdown state. After a short countdown, a drowning alarm is sent directly to the pool lifeguard, allowing an earlier alarm to the lifeguard if a potential drowning event occurs than in a pool without this technology.

In an embodiment, the above target tracking using the DeepSORT algorithm to obtain a human tracking trajectory may include the following steps.

Creating a tracker based on the human box.

In this embodiment, the tracker refers to DeepSORT the target tracking algorithm. DeepSORT is a multi-target tracking algorithm based on a Tracking-by-Detection strategy.

A motion estimation model is constructed and the motion estimation model is estimated to obtain the position of the human target of the pool in the next frame.

In this embodiment, the position of the human target in the next frame refers to the human target detection box relative to the human target detection frame at the current frame.

Specifically, the motion estimation model is the Kalman filter model. The Kalman filter is adopted as the motion estimation model, and data association is carried out according to the estimated target position in the next frame and the target position detected by the target detection network, i.e., the human body target detection box.

Data association of the human body box and the position of the human target in the next frame is performed to obtain the human target swimming trajectory.

In this embodiment, the data association of the human body box and the position of the next frame of the human target is performed, generally fusing the motion information of the target as well as the feature information of the target.

Specifically, the motion information of the human body box and the position of the next frame of the human target as well as the feature information are fused to obtain the human target swimming trajectory.

In an embodiment, the above-described data association of the human body box and the position of the next frame of the human target to obtain the human target swimming trajectory may include the following steps:

Calculating a similarity distance score for the human frame and the position of the next frame of the human target.

In this embodiment, the similarity distance score is the Mahalanobis Distance of the human target detection box and the position of the next frame of the human target, which can be used to calculate a similarity matrix after calculating the score.

Specifically, the degree of motion association is described using the Mahalanobis Distance as a distance function. Where $d_j$ denotes the jth detection result, i.e., the mentioned human target detection frame. $y_i$ denotes the ith tracking result, i.e., the position of the next target obtained by the mentioned target tracking, and $S_1^{-1}$ denotes the covariance matrix calculated by $d_j$ and $y_i$, the significance of which is to calculate the correlation between the detection target $d_j$ and the tracking target $y_i$. The final $d^{(i)}$ is the Mahalanobis Distance calculated by matching the detection result with the humane tracking result through the Hungarian algorithm, which is calculated as follows:

$$d^{(1)}(i,j)=(d_j-y_i)^T S_i^{-1}(d_j-y_i)$$

The distance between the appearance features of the human bounding box and the location of the next frame of the human target is measured by the cosine distance to obtain the appearance feature distance.

In this embodiment, the appearance feature distance is the distance between the human body box and the location of the next frame of the human target referring to the appearance feature.

The cosine distance, i.e., the cosine distance $d^{(2)}$, is used to measure the distance between appearance features, $r_j^T$ denotes the appearance features computed for each detection box $d_j$, $r_k^{(i)}$ denotes the appearance features computed for each tracking trajectory k, where $R_i$ is the set of all $r_k^{(i)}$ with a mutual association, and $r_j^T r_k^{(i)}$ computed is the cosine similarity of two appearance features. The ID can be predicted more accurately by measuring the appearance features of the tracking target and the appearance features of the detection target through the cosine distance, which is calculated as follows:

$$d^{(2)}(i,j)=\min\{1-r_j^T r_k^{(i)} | r_k^{(i)} \in R_i\}$$

The similarity distance scores as well as the appearance feature distances are weighted to obtain a similarity matrix.

In this embodiment, the similarity matrix is the degree of similarity between the human target detection box and the position of the human target in the next frame from the similarity distance score as well as the appearance feature distance.

Specifically, the similarity matrix (Cost Matrix):$c_{i,j}$ can then be obtained by the similarity distance score and the weighting of the appearance feature distance: $c_{i,j}=\lambda d^{(i)}(i,j)+(1-\lambda)d^{(2)}(i,j)$. $\lambda$ is the weighting factor of the similarity distance score.

Set matching metrics.

In this embodiment, the matching metric criterion refers to the rule that determines which trajectory belongs to the trajectory matched by the current human target.

Specifically, a certain threshold value is established for the similarity distance score as the metric criterion for matching, and eventually, the association of target motion information, as well as the association of target image feature information is considered simultaneously, and the matching problem can be equated to the optimal matching problem of the dichotomous graph, which is solved using the Hungarian matching algorithm.

Using a gating matrix to restrict the non-conforming values in the similarity matrix, the human target detection box is cascaded to match the trajectory of the human target in a cyclic matching process with a default number of iterations to obtain the human target swimming trajectory.

Figure 5:
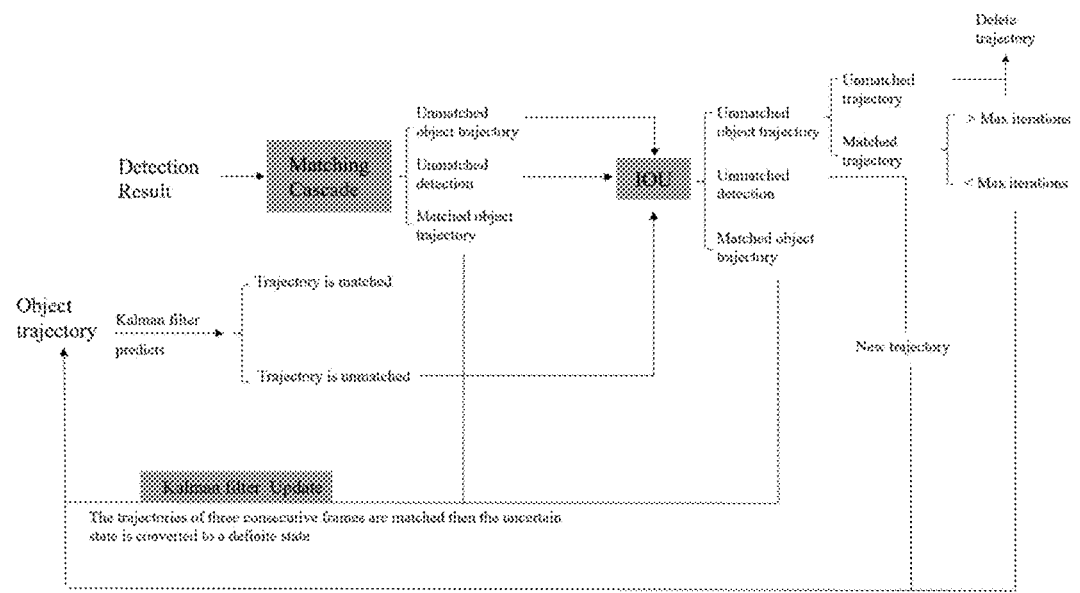
FIG. 5 is a schematic diagram of target tracking in an embodiment of the present invention.

Specifically, referring to FIG. 5, two parameters: the gating threshold and the maximum feature cosine distance are first converted into a Gate Matrix, which is used to limit excessive values in the similarity matrix. Subsequently, the trajectories of the target are matched with the detection results of the target in a cyclic matching process with a default number of iterations of 70 (max_age=70). Trajectories that have not been lost are matched first, and those that have been lost for a longer period of time are matched later.

In this embodiment, the trajectory of the human target is a trajectory consisting of the positions of all human targets predicted by the motion estimation model. The detection results of the targets are the human body boxes.

S170, updating the state database based on the bounding box sequence.

In an embodiment, the updating of the state database based on the bounding box sequence may comprise the following steps:

Calculating a matching relationship between each human head box in the bounding box sequence of the current frame and each existing human head in the state database to obtain a matching relationship.

In this embodiment, the matching relationship includes either a successful match or a failed match with the existing heads in the state database.

The status database is updated according to the matching relationship.

In order to analyze the swimming situation and realize dynamic tracking and real-time listening to possible drowning behavior, in this embodiment, a database is constructed to record the relationship between the head and water surface position of all people in the swimming pool, called the state database. For each head in the state database, a quadruple (ID, Trj, Pos, Time) is maintained, where ID represents the head number, Trj represents the coordinate trajectory of the center point of the bounding box of the head in the 100 frames before the current moment, Pos represents the position of the head in relation to the water surface in the 100 frames before the current moment, and Time represents the specific time corresponding to the 100 frames before the current moment. Pos and Time are the "first-in-first-out" queue with a maximum length of 100, and the first element in the queue indicates the head information of the first frame before the current moment.

A head tracking link is set up to update this database. Whenever this link receives the recognition result from the head position recognition module, that is, all the head bounding boxes and their positions in the current frame, it starts the tracking algorithm to calculate the matching relationship between each head in the current frame and the existing heads in the state database, and the subsequent processing is divided into three cases: first, if the match is successful, the quadruple data of the corresponding head is updated; second, if the match fails, a new head record is added; third, find the heads with the missing matching relationship in the database, and then delete their corresponding queues.

S180, generating an alarm information based on the state database and sending the alarm information to the terminal.

In this embodiment, the drowning status is determined based on the time the human head box within the status data is underwater, alarm information is generated based on the human head box where the drowning condition occurs as well as the human body box, and previous alarm information is sent to the terminal.

In addition, a real-time listening module can be set up to determine the drowning status in real-time based on the head status in the state database, and to issue a swim alarm when a person is identified as drowning. The module queries the head state database every 0.5 seconds and alarms based on the following rules:

The time that the human head is underwater ≥5 seconds is judged to be drowning and an alarm is issued.

If the relative position of the head and the water surface is maintained for ≥10 seconds, it is judged as drowning and an alarm is issued.

When the switching frequency of "above the water" and "under the water" state of a person's head is ≥3 times/second, and the moving distance is <30 cm, the system issues an alarm.

Through the camera stream to complete the detection of people in the picture, tracking, human posture estimation and behavior recognition. The algorithm recognition software can determine what condition the swimmer is in for drowning, which will trigger the alarm countdown state. After a short countdown, drowning alarms are sent directly to pool lifeguards, giving them earlier alarm of a potential drowning event than in pools without this technology.

Waterproof and anti-fog cameras are installed at specific locations in swimming pools to collect relevant images, data and other information, and provide intelligent alarms and drowning accident videos for swimming pools through server behavior analysis, pattern recognition, artificial intelligence, automatic control, and alarm technologies to ensure the safety of swimmers' lives, avoid drowning fatalities, avoid huge economic compensation, and put human safety, human life and human health in an important position, reflecting the humanistic thought and design concept of "caring for life and saving others".

Combined with hardware equipment, it automatically finds, identifies and judges drowning people, potential drowning people and suspected drowning people, and automatically alarms. Automatic alarm through the live display. Display the position of the drowning person. The intelligent monitoring system is composed of servers, waterproof dome cameras, on-site monitoring screens, alarm devices, video recording and storage systems, various sensors, sound and light alarms, cables, pipes, and on-site lifeguards. System hardware composition using high reliability and high performance computer system, completely waterproof design and in the moment of danger to give specific orientation guidance.

First, effective prevention of drowning accidents. The core technology of the method of drowning prevention intelligent system is based on the human body (and human head) detection tracking algorithm, based on image (multi-person) target detection and video action recognition, deep learning and video analysis, multi-party integrated decision-making, in the national and even the world's leading level, high reliability, easy to replicate and promote the results. The technology can be promoted in the province and to the State General Administration of Sports, and will be a strong guarantee of personal safety in swimming venues, so that the pool has no more drowning accidents.

Second, to enhance the supervision and governance of safety instructors, based on real-time status monitoring of safety instructors, the lifeguards, to capture the personnel on duty. Ensuring the actual work state of safety instructors is responsible for the safety of pool sports users, but also be able to flexibly deploy safety instructors in the system according to the feedback. In this way of digital identification and judgment to deal with the safety instructor in the departure of the problem, strengthen the natatorium to internal personnel standards and supervision ability.

Third, optimize the management of sports venues. The system is mainly applied to swimming venues, the scene has certain specificity, but its wisdom management model can be extended to other confined venues, and research to build a wisdom safety management system. At the same time, the principles of dynamic data identification, collection, tracking and analysis can be applied to the management of the Asian Games and other international and domestic large-scale comprehensive games, through artificial intelligence for auxiliary decision-making, program optimization and resource allocation, to improve the scientific and economic operation of the event and the venue.

Fourth, to realize the data of sports management. In the mode of rough venue management, functional departments cannot effectively access the venue-related service crowd data, and safety data. Unable to effectively carry out management guidance, and description development, but the completion of the project will break through the above multiple gaps and form a full range of real-time data and the venue safety database.

The above-mentioned anti-drowning safety alarm method for swimming pools, acquires the images taken by multiple cameras, detects the human body and the human head through the target detection model, and calculates the corresponding relationship so that the human body bounding box and its corresponding head bounding box belong to the same person; The human body target detection boxes and head target detection boxes are fused by multi-camera, and the bounding boxes detected in different images are aligned, so that the human body box and the head box belong to the same person. Secondly, the relative position relationship between the human body, the head, and the water surface is determined, and that of each person in the scene is recognized; The human body boxes, the human head boxes, and the position relationship are used as input to automatically track the human, the tracking results are sent to the terminal, and the state database is updated. The alarm information is generated according to the state database and sent to the terminal, so as to realize the automatic supervision of the target human in the swimming pool and improve the accuracy of anti-drowning supervision.

Figure 11:
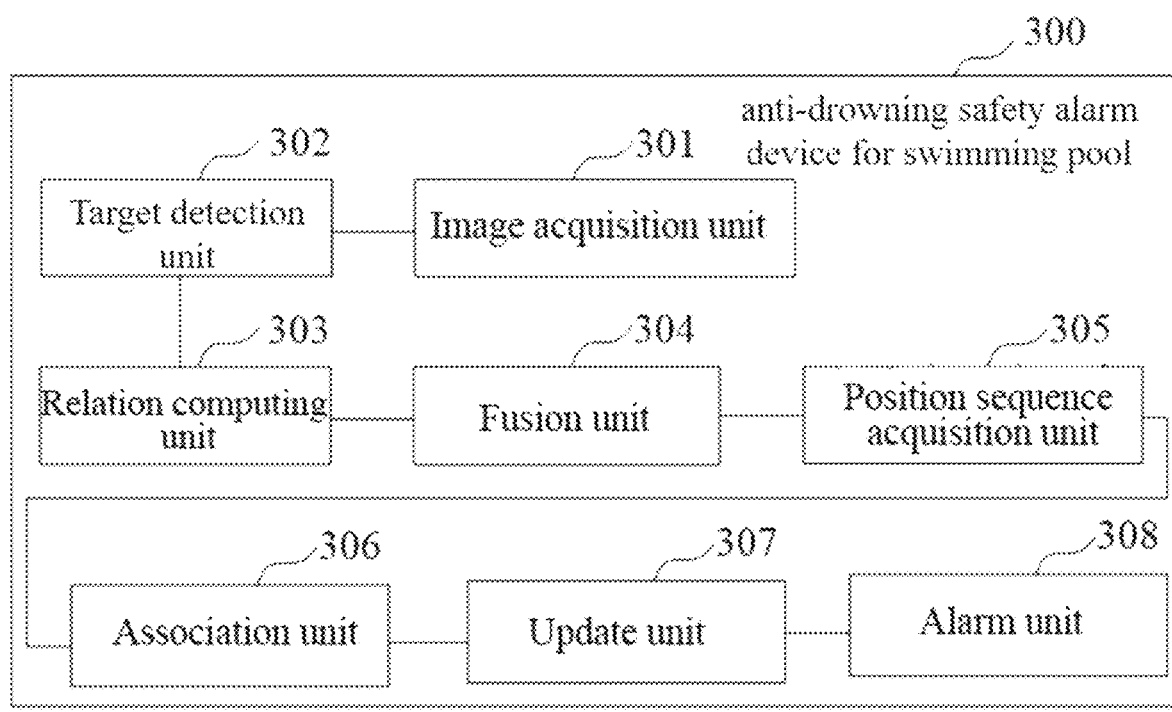
FIG. 11 is a schematic diagram of an anti-drowning safety alarm device for swimming pool in an embodiment of the present invention.

FIG. 11 is a schematic block diagram of an anti-drowning safety alarm device 300 provided by embodiments of the invention. As shown in FIG. 11, corresponding to the above anti-drowning safety alarm method, the invention also provides an anti-drowning safety alarm device 300. The anti-drowning safety alarm device 300 includes a unit for executing the above anti-drowning safety alarm method, which may be configured in a server. Specifically, referring to FIG. 11, the anti-drowning safety alarm device 300 includes an image acquisition unit 301, a target detection unit 302, a relationship calculation unit 303, a fusion unit 304, a position sequence acquisition unit 305, an association unit 306, an update unit 307, and an alarm unit 308.

The image acquisition unit 301 is used to acquire images taken by multiple cameras; the target detection unit 302 is used to input previous images into the target detection model for human body and human head detection to obtain the human body target detection box and the human head target detection box; the relationship calculation unit 303 is used to calculate the human head and human body relationship between the human body target detection box and the human head target detection box, and integrate the human body target detection box and the human head target detection box to obtain the bounding box sequence; fusion unit 304, for the human target detection box and the head target detection box for multi-camera fusion to obtain the human box and the head box; position sequence acquisition unit 305, for the body box and the head box into the relative position discrimination model to determine the relative position relationship between the human body, the human head and the water surface to obtain the relative position relationship sequence; association unit 306, for calculating the association between the bounding box sequence of the current time and the bounding box sequence of the previous moment to obtain the human tracking trajectory; update unit 307, for updating the state according to previous bounding box sequence database; alarm unit 308 for generating alarm information based on the state database and sending the alarm information to the terminal.

In an embodiment, the relationship calculation unit 303 for calculating the correspondence of the human target detection boxes and human head target detection boxes using a Hungarian algorithm, combining the human target detection boxes and human head target detection boxes, correspondence to obtain the bounding box sequence.

In an embodiment, the fusion unit 304 comprises:

Image determination subunit for determining the reference camera image and the registration camera image; internal reference calibration subunit for calibrating the internal and external references of the reference camera and the registration camera using the Zhang Zhengyou calibration method; first preprocessing subunit for preprocessing the reference camera image and the registration camera image to obtain a local world coordinate system; pose calculation subunit for calculating the relative poses between the reference camera and the registration camera; an association subunit for associating multiple cameras by the relative poses to establish a global unified world coordinate system; a position determination subunit for determining the position of each camera in the global unified world coordinate system to obtain the spatial poses of each camera; a matching degree calculation subunit for mapping the sequence of bounding boxes into the three-dimensional world coordinate system, and calculating the matching degree of the two frames in different images based on the location of the center points of the human target detection box, human head target detection box and the size of the bounding boxes; a screening subunit for screening out the human box and the human head box whose matching degree exceeds a set threshold to obtain the human box and the human head box.

In an embodiment, the association unit 306 comprises a matrix generation subunit and a matching relationship calculation subunit.

Matrix generation subunit for calculating the distance between every two human bodies between two adjacent frames according to the human body box, the human head box and the relative position relation sequence to obtain the distance matrix; and a matching relationship calculation subunit for applying distance matrix to a Hungarian matching algorithm to calculate the matching relationship of the human body boxes of two adjacent frames to obtain a human tracking trajectory.

In an embodiment, the alarm unit 308, for determining the drowning state according to the underwater time of the head box in the state data, generates the alarm information according to the head box and the body box in the drowning situation, and sends the alarm information to the terminal.

It is to be noted that a person skilled in the art can clearly understand the specific implementation process of the above anti-drowning safety alarm device 300 and the units can be referred to the corresponding description in the preceding method embodiment, and for convenience and brevity of the description, it will not be repeated here.

Figure 12:
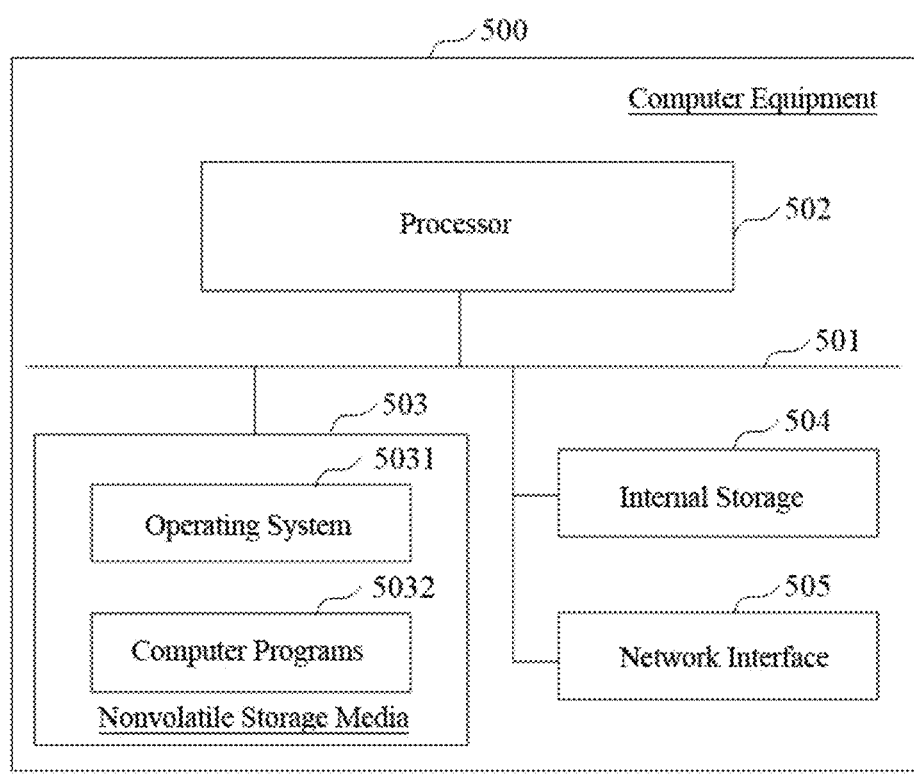
FIG. 12 is a schematic diagram of a computer device in an embodiment of the present invention.

The above anti-drowning safety alarm device 300 may be implemented in the form of a computer program that may run on a computer device as shown in FIG. 12.

FIG. 12 is a schematic block diagram of a computer device provided by an embodiment of the present application. The computer device 500 may be a server, wherein the server may be a stand-alone server or a cluster of servers comprising a plurality of servers.

Referring to FIG. 12, the computer device 500 includes a processor 502 connected via a system bus 501, a memory and a network interface 505, wherein the memory may include a non-volatile storage medium 503 and an internal memory 504.

The non-volatile storage medium 503 may store an operating system 5031 and a computer program 5032. The computer program 5032 includes program instructions that, when executed, may cause processor 502 to execute an anti-drowning safety alarm method.

The processor 502 is used to provide computing and control capabilities to support the operation of the entire computer device 500.

The internal memory 504 provides an environment for the operation of the computer program 5032 in the non-volatile storage medium 503 which, when executed by processor 502, may cause the processor 502 to execute an anti-drowning safety alarm method.

The network interface 505 is used for network communication with other devices. It will be understood by those skilled in the art that the structure illustrated in FIG. 12, which is only a block diagram of a portion of the structure associated with the present application solution, does not constitute a limitation of the computer device 500 to which the present application solution is applied, and that the specific computer device 500 may include more or fewer components than shown in the figures, or combine certain components, or have a different arrangement of components.

Wherein processor 502 is used to run a computer program 5032 stored in memory to perform the following steps:

Acquiring images taken by multiple cameras; inputting images into a target detection model for human body and human head detection to obtain human target detection boxes and human head target detection boxes; calculating the human target detection boxes and human head target detection boxes in relation to the human body and integrating the human target detection boxes and the human head target detection boxes to obtain a bounding box. The human body target detection boxes and the head target detection boxes are fused with multiple cameras to obtain the human body boxes and the head boxes; the human body box and head box are input into the relative position discrimination model to determine the relative position of the human body and the head to the water surface to obtain the relative position relationship sequence; human body box, head box and the relative position relationship sequence are calculated as the current time bounding box sequence and the previous moment bounding box sequence to obtain the human tracking trajectory; updating the state database based on the bounding box sequence; generating alarm information based on the state database and sending the alarm information to the terminal.

In an embodiment, processor 502 implements the step of training a convolutional neural network by means of a number of images labeled with the location of the human target and the location of the human head target as a sample set, by implementing the following steps:

Constructing images with human target location labels and human head target location labels as a sample set; dividing the sample set to obtain a training set, a validation set, and a test set; performing enhancement processing on the training set, validation set, and test set to obtain processed results; constructing a Yolov5 network and adding to the Yolov5 network a DLA-34 network, a Semantic Self-Attention mechanism and Anchor-free network to obtain the initial network; train and validate the initial network using the training set, validation set from the processing result and calculate the loss value of the training process; when the loss value is maintained, test the initial network using the test set from the processing result to use the trained initial network as a target detection model.

In an embodiment, using processor 502 to construct a Yolov5 network and add a DLA-34 network, a Semantic Self-Attention mechanism, and an Anchor-free network to the Yolov5 network to obtain the initial network, specifically implements the following steps:

Construct the Yolov5 network; add the DLA-34 network as the backbone network to the Yolov5 network for feature extraction to obtain the first network; add the Semantic Self-Attention mechanism to the first network to obtain the second network; and use the Anchor-free network in the target regression box network of the second network to obtain the initial network.

In an embodiment, processor 502, in implementing the step of calculating the human target detection box and head target detection box for the head-to-human relationship and integrating the human target detection box and the head target detection box to obtain a bounding box sequence, specifically implements the following steps:

The Hungarian algorithm is used to calculate the correspondence between the human target detection box and the head target detection box, and the human target detection box, the head target detection box and the correspondence are combined to obtain the bounding box sequence.

In an embodiment, processor 502, in implementing the step of fusing the human target detection boxes and human head target detection boxes with multiple cameras to obtain human body boxes and human head boxes, specifically implements the following steps:

Determining a reference camera image and a registration camera image; calibrating the internal and external parameters of the reference camera and the registration camera using the Zhang Zhengyou calibration algorithm; preprocessing the reference camera image and the registration camera image to obtain a local world coordinate system; calculating relative poses between the reference camera and the registration camera; associating multiple cameras by the relative poses to establish a global unified world coordinate system; determine the positions of each camera in the global unified world coordinate system to obtain the spatial poses of each camera; map the bounding box sequence to the three-dimensional world coordinate system, and calculate the matching degree of the two boxes in different images based on the center point positions of the human target detection box, human head target detection box and the size of the bounding boxes; filter out the human boxes and head boxes whose matching degree exceeds a set threshold to obtain human boxes and human head box to obtain the human body box and the human head box.

In an embodiment, processor 502, in realizing the step of calculating the association between the human body box, human head box and sequence of relative position relations between the bounding box sequence at the current time and the sequence of bounding boxes at the previous moment to obtain the human tracking trajectory, specifically realizes the following steps:

Calculating the distance between every two human bodies between two adjacent frames based on the human body boxes and the human head boxes of the two adjacent frames and the relative position relationship sequence to obtain a distance matrix; applying the distance matrix to a Hungarian matching algorithm to calculate the matching relationship between the human body boxes of the two adjacent frames to obtain the human tracking trajectory.

In an embodiment, processor 502, in realizing the step of generating alarm information based on the state database and sending the alarm information to the terminal, specifically realizes the following steps:

Determining the drowning status based on the time the human head box is underwater according to the state data, generating alarm information based on the human head box in which the drowning status occurs as well as the human body box, and sending the alarm information to the terminal.

It should be understood that in this application embodiment, processor 502 may be a Central Processing Unit (CPU), which may also be another general processor, Digital Signal Processor (DSP), Application Specific Integrated Circuit (ASIC), Art-Programmable Gate Array (FPGA), or another programmable logic device The general-purpose processor may be a microprocessor, a discrete gate or transistor logic device, a discrete hardware component, etc. Among them, the general-purpose processor can be a microprocessor or the processor can also be any conventional processor, etc.

It is understood by the common technical person in the art that all or part of the process in the method of realizing the above embodiments can be completed by instructing the relevant hardware through a computer program. The computer program includes program instructions, and the computer program may be stored in a storage medium, which is a computer-readable storage medium. The program instructions are executed by at least one processor in the computer system to implement the process steps of the embodiment of the method described above.

Accordingly, the invention also provides a storage medium. The storage medium may be a computer-readable storage medium. The storage medium stores a computer program, wherein the computer program, when executed by the processor, causes the processor to perform the following steps:

Acquiring images taken by multiple cameras; inputting the images into a target detection model for human body and human head detection to obtain human target detection boxes and human head target detection boxes; calculating the human target detection boxes and human head target detection boxes for human head and human body relationships, and integrating the human target detection boxes and the human head target detection boxes to obtain a bounding box sequence; the human body target detection boxes and the head target detection boxes are fused with multiple cameras to obtain the human body box and the head box; the human body boxes and the head boxes are input into the relative position discrimination model to determine the relative position of the human body and the head to the water surface to obtain the relative position relationship sequence; human body boxes, head boxes and relative position relationship sequence are calculated as the current time bounding box sequence and the previous moment bounding box sequence to obtain the human tracking trajectory; updating the state database according to the bounding box sequence; generating alarm information according to the state database and sending the alarm information to the terminal.

In an embodiment, the processor, in executing the computer program to implement the step wherein the target detection model is obtained by training a convolutional neural network with a number of images labeled with the location of the human target and the location of the human head target as a sample set, specifically implements the following steps:

Constructing images with human target location labels and human head target location labels as a sample set; dividing the sample set to obtain a training set, a validation set, and a test set; performing enhancement processing on the training set, validation set, and test set to obtain processing results; constructing a Yolov5 network and adding to the Yolov5 network a DLA-34 network, a Semantic Self-Attention mechanism and Anchor-free network to obtain the initial network; train and validate the initial network using the training set, validation set from the processing result and calculate the loss value of the training process; when the loss value is maintained, test the initial network using the test set from the processing result to use the trained initial network as a target detection model.

In an embodiment, the processor, in executing the computer program while implementing the step of constructing a Yolov5 network and adding a DLA-34 network, a Semantic Self-Attention mechanism, and an Anchor-free network to the Yolov5 network to obtain the initial network, specifically implements the following steps:

Construct the Yolov5 network; add the DLA-34 network as the backbone network to the Yolov5 network for feature extraction to obtain the first network; add the Semantic Self-Attention mechanism to the first network to obtain the second network; use the Anchor-free network in the target regression box network of the second network to obtain the initial network.

In an embodiment, the processor, in executing the computer program while implementing the step of calculating the human target detection boxes and the human head target detection boxes for head-to-human relationship and integrating the human target detection boxes and the human head target detection boxes to obtain a bounding box sequence, specifically implements the following steps:

Using the Hungarian algorithm to calculate the correspondence between the human target detection boxes and the human head target detection boxes, and combining the human target detection boxes, the human head target detection boxes, and the correspondence to obtain the bounding box sequence.

In an embodiment, the processor, in executing the computer program while implementing the step of multi-camera fusion of the human target detection boxes and the human head target detection boxes to obtain human boxes and human head boxes, specifically implements the following steps:

Determining a reference camera image and a registration camera image; calibrating the internal and external parameters of the reference camera and the registration camera using the Zhang Zhengyou calibration algorithm; preprocessing the reference camera image and the registration camera image to obtain a local world coordinate system; calculating relative poses between the reference camera and the registration camera; associating multiple cameras by the relative poses to establish a global unified world coordinate system; determining the positions of each camera in the global unified world coordinate system to obtain the spatial poses of each camera; mapping the sequence of bounding boxes into the three-dimensional world coordinate system, and calculating the matching degree of the two boxes in different images based on the center point positions of the human target detection boxes, human head target detection boxes and the size of the bounding boxes; filtering out the human boxes and head boxes whose matching degree exceeds a set threshold to obtain human boxes and human head boxes.

In an embodiment, the processor, in executing the computer program while implementing the step of calculating the association between human body boxes, human head boxes and sequence of relative position relations between the bounding box sequence at the current time and that at the previous moment to obtain the human tracking trajectory, specifically implements the following steps:

Calculating the distance between every two human bodies between two adjacent frames based on the human body boxes and the human head boxes of the two adjacent frames and the relative position relationship sequence to obtain a distance matrix; applying the distance matrix to a Hungarian matching algorithm to calculate the matching relationship between the human body boxes of the two adjacent frames to obtain the human tracking trajectory.

In an embodiment, the processor, in executing the computer program while implementing the step of generating alarm information based on the state database and sending the alarm information to the terminal, specifically implements the following steps:

Determining the drowning status based on the time the human head box is underwater according to the status data, generating an alarm information based on the human head box where the drowning status occurs as well as the human body box, and sending the alarm information to the terminal.

The storage medium may be a U disk, a mobile hard disk, a Read-Only Memory (ROM), a disk or a CD-ROM, and various other computer-readable storage media that can store program code.

Those skilled in the art can realize that the units and algorithm steps of each example described in conjunction with the embodiments disclosed in the embodiments of the present invention can be implemented by electronic hardware, computer software, or a combination of both. In order to clearly illustrate the interchangeability of hardware and software, the composition and steps of each example have been described generally in terms of function in the above notes. Whether these functions are performed in hardware or software depends on the specific application and design constraints of the technical solution. Skilled artisans may implement the described functionality using different methods for each particular application, but such implementations should not be considered beyond the scope of the present invention.

In the embodiments provided in this application, it should be understood that the disclosed apparatus and method may be implemented in other manners. For example, the apparatus embodiments described above are only illustrative. For example, the division of the units is only a logical function division. In actual implementation, there may be other division methods. For example, multiple units or components may be combined or can be integrated into another system, or some features can be ignored, or not implemented.

The steps in the method of embodiments of the invention can be sequenced, combined and deleted according to the practical needs. The units in embodiments of the apparatus of the invention can be combined, divided, and deleted according to practical needs. In addition, each functional unit in each embodiment of the invention may be integrated with a processing unit, or each unit may be physically present separately, or two or more units may be integrated with a single unit.

The integrated unit may be stored in a storage medium if it is implemented as a software functional unit and sold or used as a separate product. Based on this understanding, the technical solution of the invention is essentially or partly a contribution to the prior art, or all or part of the technical solution may be embodied in the form of a software product, stored in a storage medium, several instructions are included to make a computer device (which may be a personal computer, a terminal, or a network device, etc.) execute all or part of the steps of the method described in each embodiment of the invention.

The above are only specific embodiments of the present invention, but the protection scope of the present invention is not limited thereto. Any person skilled in the art can easily think of changes or substitutions within the technical scope disclosed by the present invention, which should be included within the protection scope of the present invention. Therefore, the protection scope of the present invention should be subject to the protection scope of the claims.

The invention claimed is:

1. An anti-drowning safety alarm method for swimming pools, which includes:

Acquiring images taken by multiple cameras;

Inputting the images into a target detection model to detect human bodies and human heads, so as to obtain human body target detection boxes and human head target detection boxes;

Calculating a relationship between the human heads and the human bodies according to the human body target detection boxes and the human head target detection boxes, and integrating the human body target detection boxes and the human head target detection boxes to obtain a bounding box sequence;

Performing multi-camera fusion on the human body target detection boxes and the human head target detection boxes to obtain human body boxes and human head boxes;

Inputting the human body boxes and the human head boxes into a relative position discrimination model to determine a relative position relationship between the human bodies or the human heads and the water surface, so as to obtain a relative position relationship sequence;

Calculating a correlation between the bounding box sequence at a current time and that at a previous moment by using the human body boxes and the human head boxes and the relative position relationship sequence, so as to obtain a human tracking trajectory;

Updating a state database based on the bounding box sequence;

Generating alarm information according to the state database and sending the alarm information to a terminal;

Wherein, the multi-camera fusion on the human body target detection boxes and the human head target detection boxes to obtain the human body boxes and the human head boxes includes the following steps:

Determining a reference camera image and a registration camera image;

Using Zhang Zhengyou calibration method to calibrate internal and external parameters of a reference camera and a registration camera;

Preprocessing the reference camera image and the registration camera image to obtain a local world coordinate system;

Calculating a relative pose between the reference camera and the registration camera;

Associating multiple cameras through the relative pose to establish a global unified world coordinate system;

Determining a position of each camera in the global unified world coordinate system to obtain a spatial pose of each camera;

Mapping the bounding box sequence into a three-dimensional world coordinate system, and calculating a matching degree of two bounding boxes in different images according to a center point position of the human body target detection boxes and the human head target detection boxes, and a size of the bounding boxes; and Screening out the human body boxes and the human head boxes whose matching degree exceeds a threshold to obtain the human body boxes and the human head boxes.

2. The anti-drowning safety alarm method for swimming pools of claim 1, wherein the target detection model is obtained by training a convolutional neural network through several images with a location label of the human body target and the human head target as a sample set, including the following steps:

Constructing images with human body target location labels and human head target location labels as a sample set;

Dividing the sample set to obtain the training set, verification set and test set;

Carrying out enhanced processing on the training set, validation set, and test set to obtain processed results;

Constructing a Yolov5 network, and adding a DLA-34 network, Semantic Self-Attention mechanism and Anchor-free network to the Yolov5 network to obtain an initial network;

Using the training set and verification set in the processed results to train and verify the initial network and calculate a loss value of the training process; and Wherein when the loss value remains unchanged, the test set in the processed result is used to test the initial network, so that the trained initial network is used as a target detection model.

3. The anti-drowning safety alarm method for swimming pools of claim 2, wherein the Yolov5 network is constructed, and the DLA-34 network, Semantic Self-Attention mechanism and Anchor-free network are added to the Yolov5 network to obtain the initial network, including the following steps:

Constructing the Yolov5 network;

Adding the DLA-34 network as the backbone network to the Yolov5 network, and extracting features to obtain a first network;

Adding the Semantic Self-Attention mechanism to the first network to obtain a second network; and Using the Anchor-free network in a target regression frame network of the second network to obtain the initial network.

4. The anti-drowning safety alarm method for swimming pools of claim 1, wherein the relationship between human heads and human bodies is calculated by the human body target detection boxes and the human head target detection boxes, and the human body target detection boxes and the human head target detection boxes are integrated to obtain the bounding box sequence, including the following steps:

The Hungarian algorithm is used to calculate a corresponding relationship between the human body target detection boxes and the human head target detection boxes, and the human body target detection boxes and the human head target detection boxes and the corresponding relationship are combined to obtain the bounding box sequence.

5. The anti-drowning safety alarm method for swimming pools of claim 1, wherein the human body boxes, the human head boxes and the relative position relationship sequence are used to calculate the correlation between the bounding box sequence at the current time and that at the previous time to obtain the human tracking trajectory, including the following steps:

Based on the human body boxes, the human head boxes and the relative position relationship sequence between them in two adjacent frames, calculating a distance between two human bodies to obtain a distance matrix; and Based on the distance matrix, calculating a matching relationship between the human body boxes of two adjacent frames by using the Hungarian algorithm, so as to obtain the human tracking trajectory.

6. The anti-drowning safety alarm method for swimming pools of claim 1, wherein the alarm information is generated according to the state database and sent to the terminal, including the following steps:

A drowning state is determined by an underwater time of the human head boxes in the state data, and alarm information is generated according to the human head boxes and the human body boxes in the drowning state and sent to the terminal.

7. An anti-drowning safety alarm device for swimming pools, which includes:

An image acquisition unit, which is used to acquire images taken by multiple cameras;

A target detection unit, which is used to input the images into a target detection model to detect human bodies and human heads, so as to obtain human body target detection boxes and human head target detection boxes;

A relationship calculation unit, which is used to calculate a relationship between the human heads and the human bodies according to the human body target detection boxes and the human head target detection boxes, and integrate the human body target detection boxes and the human head target detection boxes to obtain a bounding box sequence;

A fusion unit, which is used to perform multi-camera fusion on the human body target detection boxes and the human head target detection boxes to obtain human body boxes and human head boxes;

A position sequence acquisition unit, which is used to input the human body boxes and the human head boxes into a relative position discrimination model to determine a relative position relationship between the human bodies or the human heads and the water surface, so as to obtain a relative position relationship sequence;

An association unit, which is used to calculate a correlation between the bounding box sequence at a current time and that at a previous moment by using the human body boxes and the human head boxes and the relative position relationship sequence, so as to obtain a human tracking trajectory;

An update unit, which is used to update a state database based on the bounding box sequence;

An alarm unit, which is used to generate alarm information according to the state database and send the alarm information to a terminal;

Wherein, the multi-camera fusion on the human body target detection boxes and the human head target detection boxes to obtain the human body boxes and the human head boxes includes the following steps:

Determining a reference camera image and a registration camera image;

Using Zhang Zhengyou calibration method to calibrate internal and external parameters of a reference camera and a registration camera;

Preprocessing the reference camera image and the registration camera image to obtain a local world coordinate system;

Calculating a relative pose between the reference camera and the registration camera;

Associating multiple cameras through the relative pose to establish a global unified world coordinate system;

Determining a position of each camera in the global unified world coordinate system to obtain a spatial pose of each camera;

Mapping the bounding box sequence into a three-dimensional world coordinate system, and calculating a matching degree of two bounding boxes in different images according to a center point position of the human body target detection boxes and the human head target detection boxes, and a size of the bounding boxes; and Screening out the human body boxes and the human head boxes whose matching degree exceeds a threshold to obtain the human body boxes and the human head boxes.

* * * * *